United States Patent
Hara

(10) Patent No.: US 12,340,344 B2
(45) Date of Patent: Jun. 24, 2025

(54) REGISTRATION DEVICE, METHOD CARRIED OUT BY REGISTRATION DEVICE, AND NON-TRANSITORY COMPUTER READABLE MEDIUM

(71) Applicant: Toshiba Tec Kabushiki Kaisha, Tokyo (JP)

(72) Inventor: Noriyoshi Hara, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 81 days.

(21) Appl. No.: 18/159,668

(22) Filed: Jan. 25, 2023

(65) Prior Publication Data

US 2023/0169460 A1 Jun. 1, 2023

Related U.S. Application Data

(63) Continuation of application No. 17/108,960, filed on Dec. 1, 2020, now abandoned.

(30) Foreign Application Priority Data

Feb. 4, 2020 (JP) .................................. 2020-016893

(51) Int. Cl.
*G06Q 10/087* (2023.01)
*G01G 19/52* (2006.01)
(Continued)

(52) U.S. Cl.
CPC ............ *G06Q 10/087* (2013.01); *G01G 19/52* (2013.01); *G06Q 20/4014* (2013.01);
(Continued)

(58) Field of Classification Search
CPC ............. G06Q 10/087; G06Q 20/4014; G06Q 20/40155; G06Q 30/0185
(Continued)

(56) References Cited

U.S. PATENT DOCUMENTS 10,318,917 B1* 6/2019 Goldstein ............ G06Q 20/203
10,621,444 B1* 4/2020 Mirza .................... G06V 10/82
(Continued)

FOREIGN PATENT DOCUMENTS

CN 110164029 A 8/2019
JP 2017199234 A * 11/2017 ......... G06K 9/00268
(Continued)

OTHER PUBLICATIONS

Extended European Search Report mailed Jul. 20, 2021 in corresponding European Patent Application No. 21151870.9, 9 pages.
(Continued)

*Primary Examiner* — Ariel J Yu
*Assistant Examiner* — Denisse Y Ortiz Roman
(74) *Attorney, Agent, or Firm* — Kim & Stewart LLP

(57) ABSTRACT

A registration device includes a shelf including a sensor and on which a commodity is placed, a camera configured to capture an image of a first area and a second area outside the first area, and a processor configured to start tracking of a customer who has entered the second area from outside based on the image captured by the camera, determine whether the commodity is taken from the shelf based on changes in weight measured by the sensor, upon determining that the commodity has been taken, determine whether the tracked customer performs a particular action within the first area, upon determining that the tracked customer has performed the particular action, determine whether the customer has entered the second area, and upon determining that the customer has entered the second area, register the taken commodity as a commodity being purchased by the customer.

20 Claims, 12 Drawing Sheets

(51) Int. Cl.
     *G06Q 20/40*      (2012.01)
     *G06Q 30/018*     (2023.01)
     *G06V 40/20*      (2022.01)
     *G07C 9/00*       (2020.01)
(52) U.S. Cl.
     CPC ... *G06Q 20/40155* (2020.05); *G06Q 30/0185* (2013.01); *G06V 40/23* (2022.01); *G07C 9/00* (2013.01)
(58) Field of Classification Search
     USPC .......................................................... 705/28
     See application file for complete search history.

(56) References Cited

U.S. PATENT DOCUMENTS

| | | |
|---|---|---|
| 2015/0026010 A1 | 1/2015 | Ellison |
| 2015/0039458 A1 | 2/2015 | Reid |
| 2019/0244161 A1 | 8/2019 | Abhishek et al. |

FOREIGN PATENT DOCUMENTS

| | | |
|---|---|---|
| JP | 2019-079153 A | 5/2019 |
| JP | 2019-150123 A | 9/2019 |

OTHER PUBLICATIONS

Office Action mailed Jul. 27, 2022 in corresponding Chinese Patent Application No. 202011310584.4, 17 pages (with Translation).
Office Action mailed Sep. 12, 2023, in corresponding Japanese Patent Application No. 2020-016893, 6 pages (with Translation).

* cited by examiner

REGISTRATION DEVICE, METHOD CARRIED OUT BY REGISTRATION DEVICE, AND NON-TRANSITORY COMPUTER READABLE MEDIUM

CROSS-REFERENCE TO RELATED APPLICATION

This application is a continuation of U.S. Patent Application No. 17/108,960, filed Dec. 1, 2020, which is based upon and claims the benefit of priority from Japanese Patent Application No. 2020-016893, filed on Feb. 4, 2020, the entire contents of which are incorporated herein by reference.

FIELD

Embodiments described herein relate generally to a registration device, a method carried out by the registration device, and a non-transitory computer readable medium.

BACKGROUND

In recent years, labor shortages have been becoming a problem for retail businesses. There has been an increasing demand for a system to reduce labor requirements. To meet such a demand, there have been proposed various store systems that automatically register a commodity to be purchased by a customer according to his or her actions in a store. As one of these store systems, there is a store system that identifies a customer who has taken out a commodity from a display shelf as a purchaser of the commodity when the action of taking out the commodity is detected near the shelf. However, in such a store system, it is generally necessary to change a store layout and setup a large number of cameras and the like so as to achieve automatic registration processing for the entire store. As such, the burden on the store side is large to install such a store system. Accordingly, there is a need for an automatic commodity registration system that can be introduced with only small changes to existing store systems.

DETAILED DESCRIPTION

One or more embodiments provide a registration device that can automatically register commodities and can be introduced with smaller changes to existing store systems.

In one embodiment, a registration device includes a shelf including a sensor and on which a commodity is placed, a camera configured to capture an image of a first area and a second area outside the first area, and a processor. The processor is configured to start tracking of a customer who has entered the second area from outside the first and second areas based on images captured by the camera, determine whether the commodity has been taken from the shelf based on changes in weight measured by the sensor, upon determining that the commodity has been taken, determine whether the tracked customer has performed a particular action within the first area, upon determining that the tracked customer has performed the particular action, determine whether the customer has entered the second area from the first area, and upon determining that the customer has entered the second area from the first area, register the taken commodity as a commodity being purchased by the customer.

One or more embodiments are explained below with reference to the drawings. In those embodiments, shelf-type display furniture and a transaction processing system including the shelf-type display furniture are explained. Further, the transaction processing system processes a transaction on a commodity purchased by a customer in a store.

Figure 1:
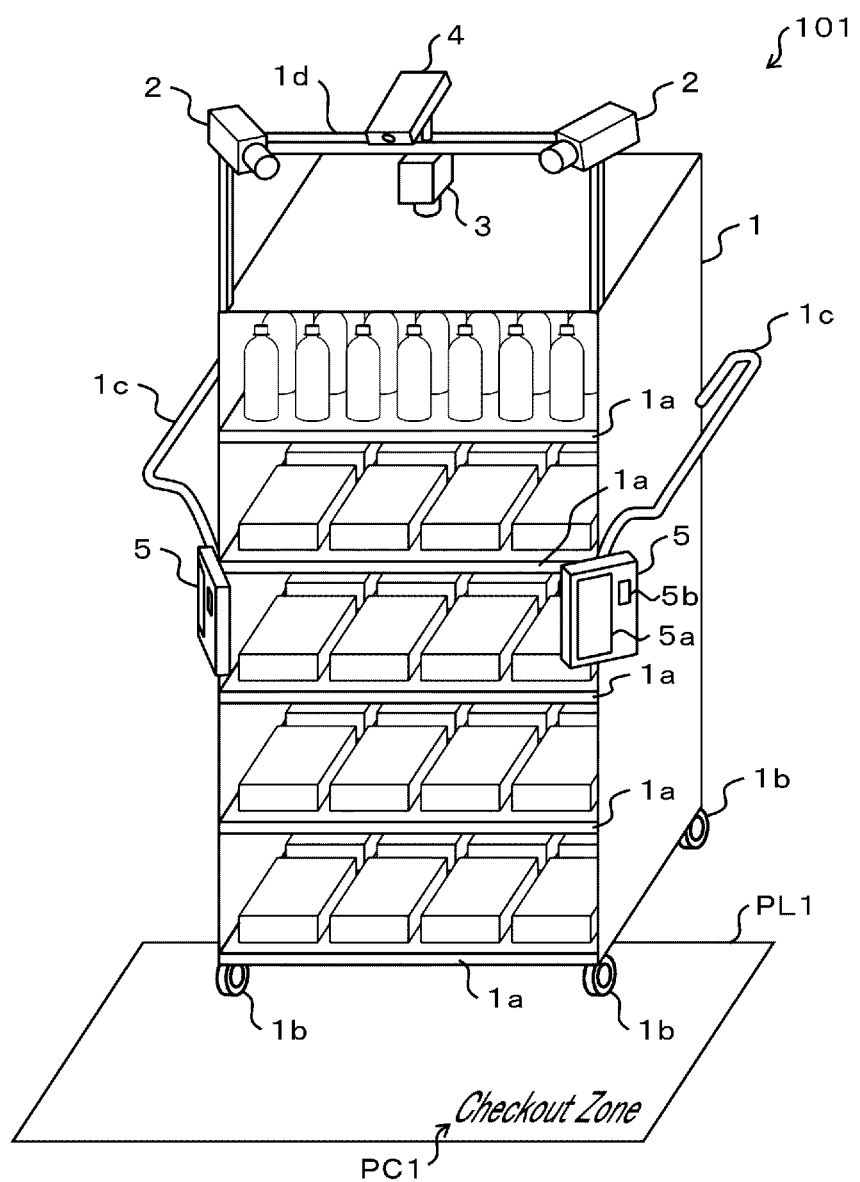
FIG. 1 is a perspective view schematically illustrating a registration apparatus according to an embodiment.

FIG. 1 is a perspective view schematically illustrating a registration device 101 according to an embodiment.

The registration device 101 includes a shelf 1. The shelf 1 has a rectangular shape in which one surface is opened. The shelf 1 includes a plurality of shelf plates 1a, a plurality of casters 1b, a plurality of handles 1c, and a supporting member 1d. In some examples, the registration device 101 may be referred to as a smart display device or a smart shelf device. Furthermore, while registration device 101 of this particular example incorporates a shelf-like structure, the present disclosure is not limited to any particular display furniture design or layout.

The shelf plates 1a are attached to an internal space of the shelf 1. Any number of the shelf plates 1a may be installed in the shelf 1, and the shelf plates 1a may be installed at any position in the shelf 1. However, in FIG. 1, as an example, the number of the shelf plates 1a is five. Commodities are displayed on the shelf plates 1a as illustrated in FIG. 1.

The casters 1b are attached to the bottom of the shelf 1. The registration device 101 can be easily moved on a floor by the casters 1b.

The handles 1c are respectively attached to two sidewall outer surfaces orthogonal to the opening surface of the shelf 1 and the floor. The handles 1c are gripped by an operator if the registration device 101 is moved. Any number of the handles 1c may be installed, and the handles 1c may be installed at any position. The handles 1c may be omitted from the shelf 1.

The supporting member 1d is attached to a top plate outer surface of the shelf 1 in a state in which the supporting member 1d projects upward. The supporting member 1d supports two tracking cameras 2, a monitoring camera 3, and a projector 4.

The two tracking cameras 2 photograph a customer present in a photographing area including a purchase area, a detection area, a preliminary area, and a confirmation area explained below. Each of the two tracking cameras 2 may photograph the photographing area, or only one tracking camera 2 may photograph a part of the photographing area. Only one of the tracking cameras 2 may be provided, or one or more additional tracking cameras 2 may be provided. The tracking cameras may be attached to any position of the shelf 1. Images photographed by the tracking cameras 2 are used to track the customer. The tracking is explained below. As the tracking cameras 2, well-known camera devices such as optical cameras, infrared cameras, TOF (time of flight) cameras, and stereo cameras can be used. As the tracking cameras 2, camera devices suitable for measuring a distance to an object, such as TOF cameras or stereo cameras, are preferable.

The monitoring camera 3 photographs the opening surface of the shelf 1 and a space further on the outer side of the shelf 1 than the opening surface. An image photographed by the monitoring camera 3 is used to monitor and detect an action of the customer extending his or her hand to the inside of the shelf 1. The monitoring is explained below. As the monitoring camera 3, a well-known camera device, such as an optical camera, an infrared camera, a TOF camera, and a stereo camera, can be used. As the monitoring camera 3, a camera device suitable for measuring a distance to an object, such as a TOF camera or a stereo camera, is preferable.

The projector 4 projects an image onto a floor surface. A line PL1 and characters PC1 illustrated in FIG. 1 are included in the image projected by the projector 4. The projector 4 can be omitted when, for example, a mat having size equivalent to the area surrounded by the line PL1 is laid on the floor.

User interface (UI) units 5 are respectively attached to both side ends of the opening surface of the shelf 1. Each UI unit 5 includes input devices including a touch panel 5*a* and a reader 5*b* and performs a user interface operation. The touch panel 5*a* and the reader 5*b* are explained below. When it is necessary to distinguish between the two UI units 5 in the following explanation, the UI unit 5 illustrated on the left side in FIG. 1 is referred to as a "first UI unit 5" and the other UI unit 5 is referred to as a "second UI unit 5".

Figure 2:
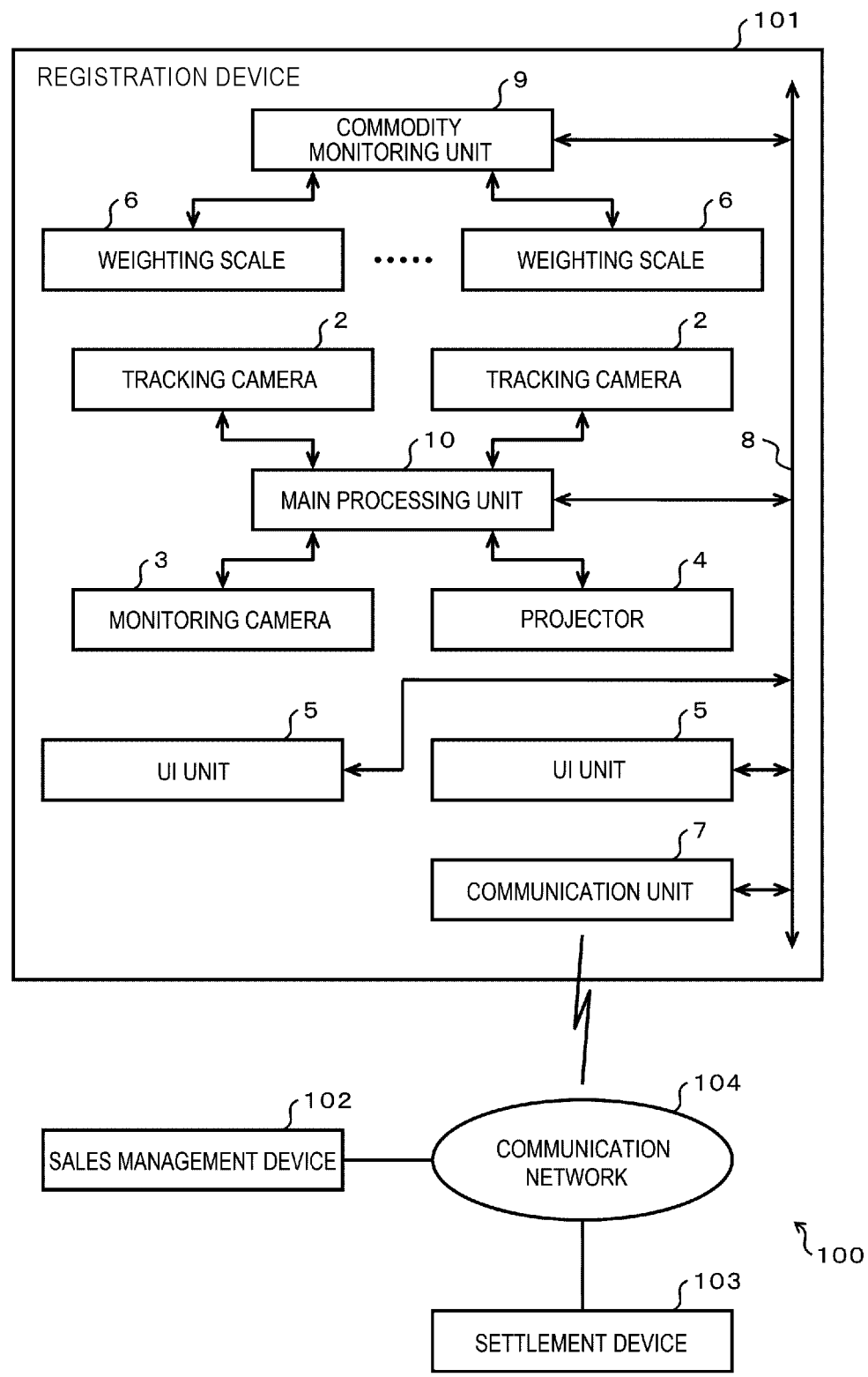
FIG. 2 is a schematic block diagram illustrating a transaction processing system.

FIG. 2 is a schematic block diagram illustrating a transaction processing system 100 including the registration device 101. In FIG. 2, the same components as the components illustrated in FIG. 1 are denoted by the same reference numerals and signs.

The registration device 101, a sales management device 102, and a settlement device 103 are communicably connected via a communication network 104 to make up the transaction processing system 100.

The sales management device 102 is an information processing device that performs information processing for managing sales of commodities displayed on the registration device 101. The settlement device 103 is an information processing device that performs information processing for settlement concerning the sales of the commodities displayed on the registration device 101. As the communication network 104, for example, the Internet, a VPN (virtual private network), a LAN (local area network), a public communication network, a mobile communication network, and the like can be used alone or can be used in combination as appropriate. In one embodiment, the registration device 101, the sales management device 102, and the settlement device 103 are provided in one store. In such a case, as the communication network 104, typically, an intra-store LAN is used.

The registration device 101 includes a plurality of weighting scales 6, a communication unit 7, a communication path 8, a commodity monitoring unit 9, and a main processing unit 10 in addition to the tracking cameras 2, the monitoring camera 3, the projector 4, and the UI unit 5 illustrated in FIG. 1 as well.

The tracking cameras 2, the monitoring camera 3, and the projector 4 are connected to the main processing unit 10. The UI unit 5 is connected to the communication path 8.

The weighting scales 6 are provided in the shelf plates 1*a* and measure the weights of the commodities displayed on the shelf plates 1*a*. One weighting scale 6 may be provided in each shelf plate 1*a* or a plurality of weighting scales 6 may be provided in each shelf plate 1*a*. The weighting scales 6 output measurement data representing the measured weights of commodities to the commodity monitoring unit 9.

The communication unit 7 performs wireless communication for data exchange via the communication network 104. If the communication network 104 is a LAN, as the communication unit 7, for example, a well-known communication device conforming to the IEEE802.11 standard can be used. However, as the communication unit 7, a communication device that performs wired communication may be used.

The communication path 8 enables the UI unit 5, the communication unit 7, the commodity monitoring unit 9, and the main processing unit 10 to exchange data. As the communication path 8, for example, a LAN is used.

The commodity monitoring unit 9 performs, based on measurement data given from the weighting scales 6, information processing for monitoring a display state of the commodities in the shelf 1. The commodity monitoring unit 9 may be a controller including a processor and a memory as described below, or a circuit, to perform such information processing.

The main processing unit 10 specifies, based on images photographed by the tracking cameras 2 and the monitoring camera 3, a customer taking out a commodity from the shelf 1 and performs information processing for causing the customer to settle a price of the commodity. The main processing unit 10 may be a controller including a processor and a memory as described below, or a circuit, to perform such information processing.

Figure 3:
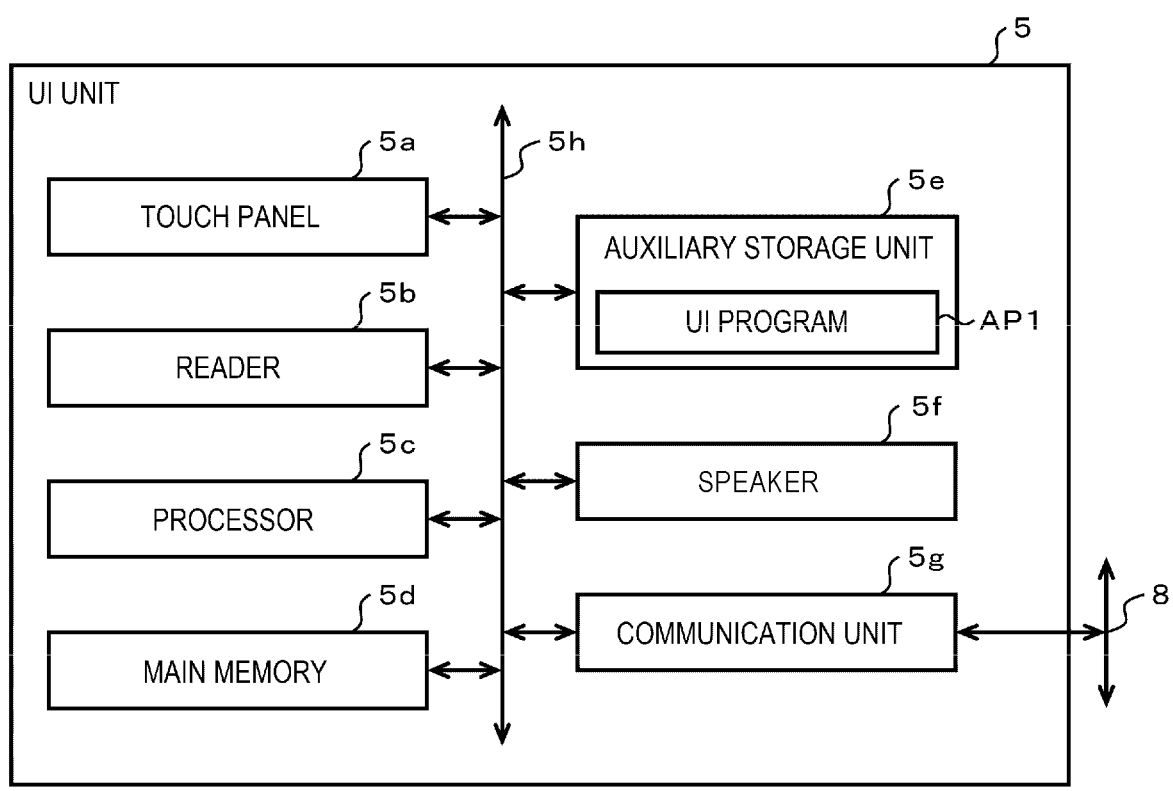
FIG. 3 is a block diagram illustrating a user interface unit.

FIG. 3 is a block diagram illustrating the UI unit 5. In FIG. 3, the same components as the components illustrated in FIGS. 1 and 2 are denoted by the same reference numerals and signs.

The UI unit 5 includes a processor 5*c*, a main memory 5*d*, an auxiliary storage unit 5*e*, a speaker 5*f*, a communication unit 5*g*, and a transmission path 5*h* in addition to the touch panel 5*a* and the reader 5*b* illustrated in FIG. 1.

The processor 5*c*, the touch panel 5*a*, the reader 5*b*, the main memory 5*d*, the auxiliary storage unit 5*e*, the speaker 5*f*, and the communication unit 5*g* are communicably connected via the transmission path 5*h*.

The touch panel 5*a* is a display device that displays various screens such as operation screens. The touch panel 5*a* is an operation device that receives operation corresponding to the operation screen.

The reader 5*b* reads a member ID (identifier) from a medium presented by a customer. As the reader 5*b*, a well-known data reading device that reads a visible code, such as a barcode or a two-dimensional code, displayed on the medium. As the reader 5*b*, a well-known data reading device of another type, such as a well-known magnetic card reader, a well-known IC (integrated circuit) card reader, or a well-known noncontact card reader, may also be used. As the reader 5b, reading devices of a plurality of types may be provided.

The processor 5c, the main memory 5d, and the auxiliary storage unit 5e are connected by the transmission path 5h to make up a controller for controlling the UI Unit 5.

The processor 5c executes, according to an operating system and information processing programs such as application programs, information processing for performing various functions of the UI unit 5. The processor 5c is, for example, a CPU (central processing unit).

The main memory 5d includes a nonvolatile memory region and a volatile memory region. The information processing programs are stored in the nonvolatile memory region. In the nonvolatile or volatile memory region, data necessary for the processor 5c to execute the information processing may be stored. The volatile memory region operates as a work area where data is temporarily stored by the processor 5c. The nonvolatile memory region is, for example, a ROM (read only memory). The volatile memory region is, for example, a RAM (random access memory).

As the auxiliary storage unit 5e, a storage device including a well-known storage device, such as an EEPROM (electric erasable programmable read-only memory), an HDD (hard disc drive), or an SSD (solid state drive), can be used. The auxiliary storage unit 5e stores data used by the processor 5c in performing various kinds of processing, data generated by the processing in the processor 5c, or the like. The auxiliary storage unit 5e stores the information processing programs.

The speaker 5f outputs various sounds such as voice sounds and melodies.

The communication unit 5g is an interface circuit for data communication via the communication path 8. As the communication unit 5g, for example, a well-known communication device for performing data communication via a LAN can be used.

The transmission path 5h includes an address bus, a data bus, and a control signal line by which data and control signals are exchanged among the circuits or devices connected by the transmission path 5h.

The auxiliary storage unit 5e stores a UI program AP1, which is one of the information processing programs. The UI program AP1 is an application program for causing the UI unit 5 to function as a user interface of the registration device 101.

Figure 4:
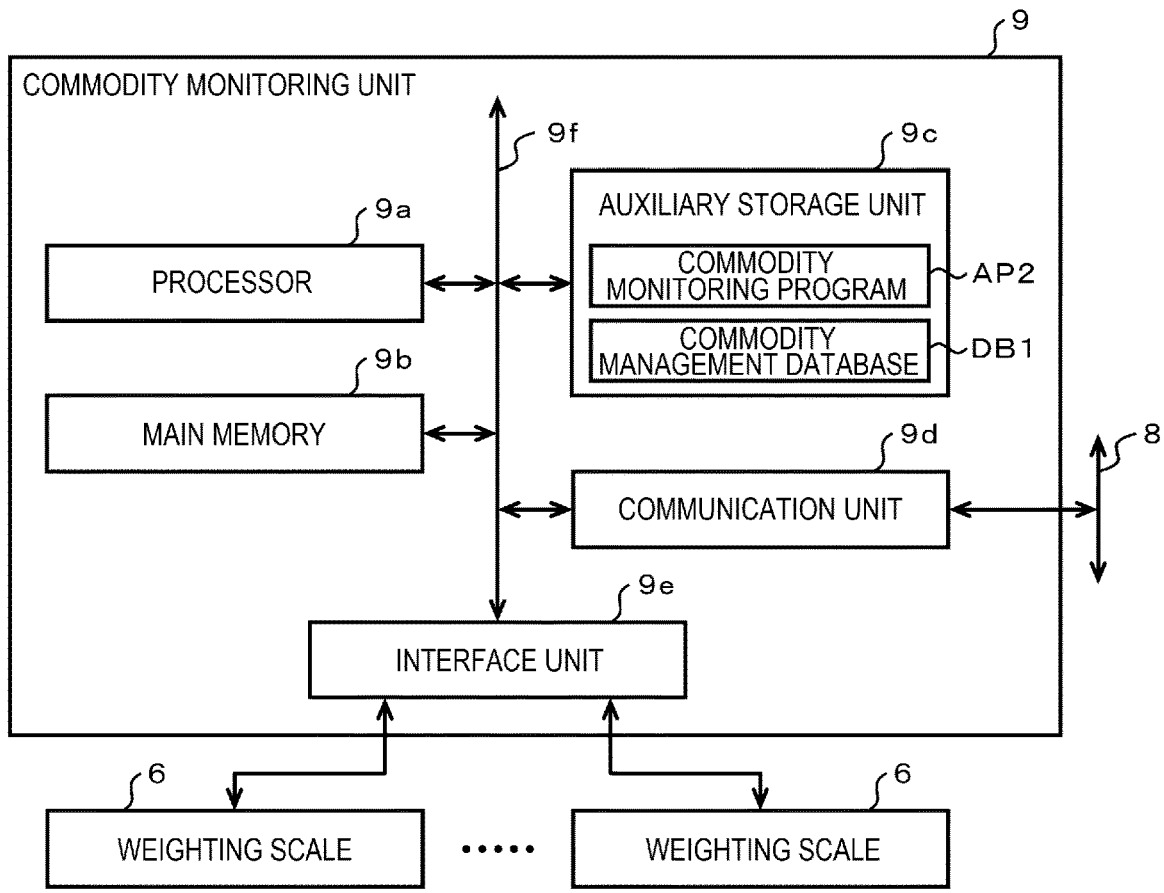
FIG. 4 is a block diagram illustrating a commodity monitoring unit.

FIG. 4 is a block diagram illustrating the commodity monitoring unit 9. In FIG. 4, the same components as the components illustrated in FIGS. 1 and 2 are denoted by the same reference numerals and signs.

The commodity monitoring unit 9 includes a processor 9a, a main memory 9b, an auxiliary storage unit 9c, a communication unit 9d, an interface unit 9e, and a transmission path 9f.

The processor 9a, the main memory 9b, the auxiliary storage unit 9c, the communication unit 9d, and the interface 9e are communicably connected via the transmission path 9f. The processor 9a, the main memory 9b, and the auxiliary storage unit 9c are connected by the transmission path 9f to make up a controller for controlling the commodity monitoring unit 9.

The processor 9a executes, according to an operating system and information processing programs such as application programs, information processing for performing various functions of the commodity monitoring unit 9. The processor 9a is, for example, a CPU.

The main memory 9b includes a nonvolatile memory region and a volatile memory region. The information processing programs are stored in the nonvolatile memory region. In the nonvolatile or volatile memory region, data necessary for the processor 9a to execute information processing may be stored. The volatile memory region operates as a work area where data is temporarily stored and rewritten by the processor 9a. The nonvolatile memory region is, for example, a ROM. The volatile memory region is, for example, a RAM.

As the auxiliary storage unit 9c, a storage unit including a well-known storage device, such as an EEPROM, a HDD, or an SSD, may be used. The auxiliary storage unit 9c stores data used by the processor 9a in performing various kinds of processing, data generated by the processing in the processor 9a, or the like. The auxiliary storage unit 9c stores the information processing programs.

The communication unit 9d is an interface circuit for data communication via the communication path 8. As the communication unit 9d, for example, a well-known communication device for performing data communication via a LAN can be used.

Each of the plurality of weighting scales 6 are connected to the interface unit 9e. Data is exchanged between the processor 9a and the weighting scales 6 through the interface unit 9e. As the interface unit 9e, a well-known device, such as an interface board including a USB (universal serial bus) board, can be used. A plurality of interface units 9e may be provided.

The transmission path 9f includes an address bus, a data bus, and a control signal line, and data and control signals are exchanged through the transmission path 9f among the circuits or devices connected by the transmission path 9f.

The auxiliary storage unit 9c stores a commodity monitoring program AP2, which is one of the information processing programs. The commodity monitoring program AP2 is an application program for performing a function of the commodity monitoring unit 9. A part of a storage region of the auxiliary storage unit 9c is used as a storage region for a commodity management database DB1. The commodity management database DB1 is a database for managing the commodities displayed on the registration device 101.

Figure 5:
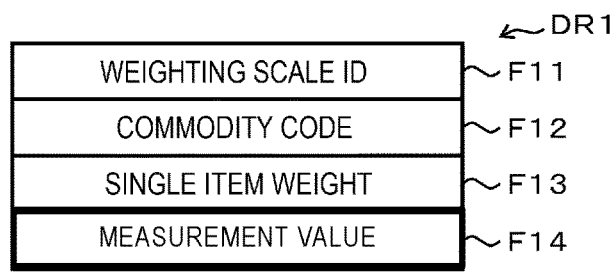
FIG. 5 is a diagram schematically illustrating a data record included in a commodity management database.

FIG. 5 is a diagram schematically illustrating a data record DR1 included in the commodity management database DB1.

The commodity management database DB1 is a set of a plurality of data records DR1 respectively correlated with the plurality of weighting scales 6. The data record DR1 includes fields F11, F12, F13, and F14. In the field F11, a weighting scale ID for distinguishing the weighting scale 6 from the other weighting scales 6 is set. In the field F12, a commodity code for distinguishing a commodity placed on the weighting scale 6 from the other commodities is set. The commodity code is an identification code to identify a commodity for each of various SKUs (stock keeping units). For example, a JAN (Japanese article number) code is used. In the field F13, the weight of a single item of the commodity identified by the commodity code set in the field F12 is set. In the field F14, a measurement value that has been most recently output by the weighting scale 6 is set. The data record DR1 may include a field in which any data different from the data explained above is set.

Figure 6:
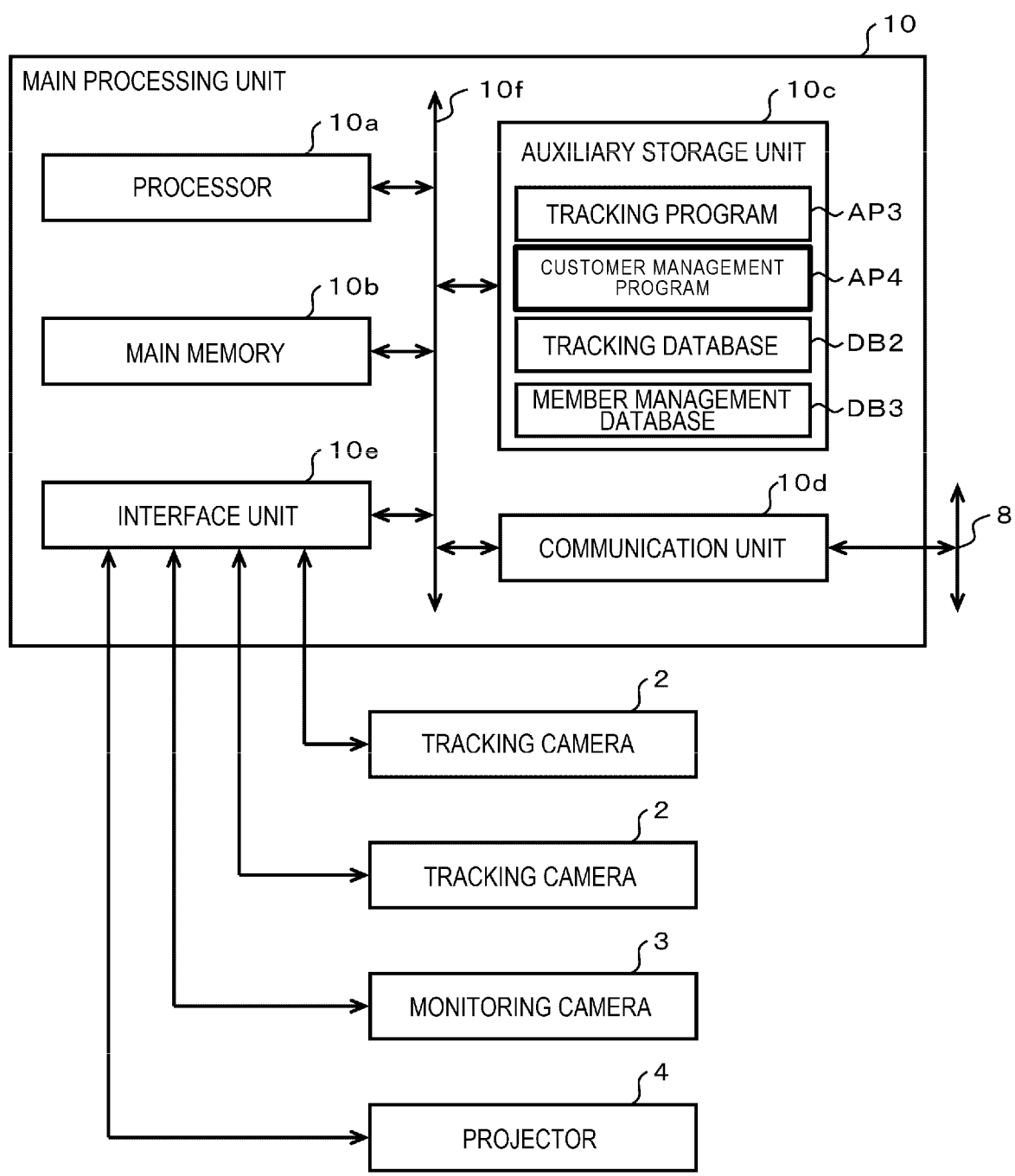
FIG. 6 is a block diagram illustrating a main processing unit.

FIG. 6 is a block diagram illustrating the main processing unit 10. In FIG. 6, the same components as the components illustrated in FIGS. 1 and 2 are denoted by the same reference numerals and signs.

The main processing unit 10 includes a processor 10a, a main memory 10b, an auxiliary storage unit 10c, a communication unit 10d, an interface unit 10e, and a transmission path 10f.

The processor 10a, the main memory 10b, the auxiliary storage unit 10c, the communication unit 10d, and the interface unit 10e are communicably connected via the transmission path 10f. The processor 10a, the main memory 10b, and the auxiliary storage unit 10c are connected by the transmission path 10f to make up a controller for controlling the main processing unit 10.

The processor 10a executes, according to an operating system and information processing programs, such as application programs, information processing for performing various functions of the main processing unit 10. The processor 10a is, for example, a CPU.

The main memory 10b includes a nonvolatile memory region and a volatile memory region. The information processing programs are stored in the nonvolatile memory region. In the nonvolatile or volatile memory region, data necessary for the processor 10a to execute information processing may be stored. The volatile memory region operates as a work area where data is temporarily stored by the processor 10a. The nonvolatile memory region is, for example, a ROM. The volatile memory region is, for example, a RAM.

As the auxiliary storage unit 10c, a storage unit including a well-known storage device, such as an EEPROM, a HDD, or an SSD, can be used. The auxiliary storage unit 10c stores data used by the processor 10a in performing various kinds of processing, data generated by the processing in the processor 10a, or the like. The auxiliary storage unit 10c stores the information processing programs.

The communication unit 10d is an interface circuit for data communication via the communication path 8. As the communication unit 10d, for example, a well-known communication device for performing data communication via a LAN can be used.

Each of the two tracking cameras 2, the monitoring camera 3, and the projector 4 is connected to the interface unit 10e. The interface unit 10e interfaces exchange of data between the processor 10a and the tracking cameras 2, the monitoring camera 3, and the projector 4. As the interface unit 10e, a well-known device such as an interface board including a USB board can be used. A plurality of interface units 10e may be provided.

The transmission path 10f includes an address bus, a data bus, and a control signal line through which data and control signals are exchanged among the circuits and devices connected by the transmission path 10f.

The auxiliary storage unit 10c stores a tracking program AP3 and a customer management program AP4, each of which is one of the information processing programs. The tracking program AP3 is an application program for tracking of a customer as described below. The customer management program AP4 is an application program for managing the customer as described below. A part of a storage region of the auxiliary storage unit 10c is used as storage regions of a tracking database DB2 and a member management database DB3. The tracking database DB2 is a database for managing data for tracking a customer set as a tracking target. The member management database DB3 is a database for managing a member being tracked.

Figure 7:
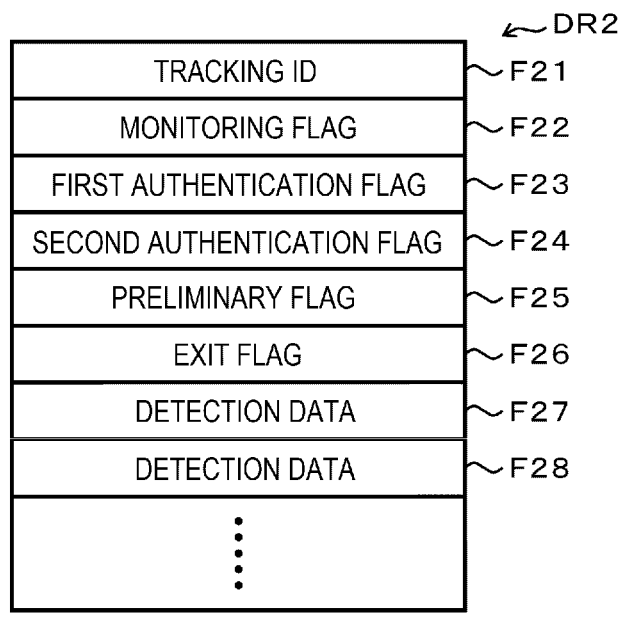
FIG. 7 is a diagram schematically illustrating a data record included in a tracking database.

FIG. 7 is a diagram schematically illustrating a data record DR2 included in the tracking database DB2.

The tracking database DB2 is a set of data records DR2 respectively correlated with customers set as tracking targets. The data record DR2 includes fields F21, F22, F23, F24, F25, F26, and F27. The data record DR2 may further include a field F28 and subsequent fields. In the field F21, a tracking ID allocated to distinguish a customer from other customers is set. The tracking ID is temporarily allocated to the customer set as a tracking target and is not data for specifying an individual. In the field F22, a monitoring flag indicating whether the customer is set as a target of action monitoring is set. In an embodiment, if the monitoring flag is enabled, the monitoring flag indicates that the customer is set as the target of the action monitoring. In the field F23, a first authentication flag indicating whether the customer is located in an authentication area corresponding to the first UI unit 5 is set. In the field F24, a second authentication flag indicating whether the customer is located in an authentication area corresponding to the second UI unit 5 is set. In an embodiment, if both the first authentication flag and the second authentication flag are enabled, the first authentication flag and the second authentication flag indicate that the customer is located in the authentication areas. In the field F25, a preliminary flag indicating whether the customer is located in a preliminary area explained below is set. In an embodiment, if the preliminary flag is enabled, the preliminary flag indicates that the customer is located in the preliminary area. In the field F26, an exit flag indicating whether the customer has left a tracking area explained below is set. In an embodiment, if the exit flag is enabled, the exit flag indicates that the customer has left the tracking area. In the field F27, detection data representing a result of one position detection concerning the customer is set. According to the movement of the customer, fields in which detection data representing results of position detection after the movement is set are sequentially added after the field F28. The data record DR2 may include a field in which any data different from the data explained above is set.

Figure 8:
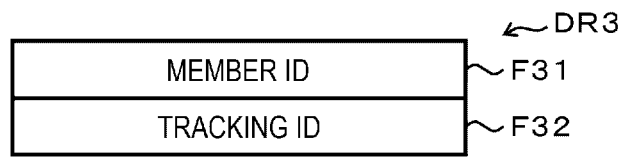
FIG. 8 is a diagram schematically illustrating a data record included in a member management database.

FIG. 8 is a diagram schematically illustrating a data record DR3 included in the member management database DB3.

The member management database DB3 is a set of data records DR3 respectively correlated with customers who are set as tracking targets and for which member authentication has been done. Accordingly, the member management database DB3 has the number of data records DR3 corresponding to the number of the authenticated customers. A situation in which the member management database DB3 does not include the data record DR3 at all could occur. The data record DR3 includes fields F31 and F32. In the field F31, a member ID given to the customer is set. In the field F32, a tracking ID for tracking the customer (i.e., the member) is set. The data record DR3 may include a field in which any data different from the data explained above is set.

As hardware of the commodity monitoring unit 9 or the main processing unit 10, for example, a general-purpose information processing device may be used. In general, the commodity monitoring unit 9 or the main processing unit 10 are provided in a state in which the commodity monitoring program AP2 or the tracking program AP3 and the customer management program AP4 are respectively stored, and the commodity management database DB1 or the tracking database DB2 and the member management database DB3 are not stored, in the auxiliary storage unit 9c or the auxiliary storage unit 10c. However, the hardware may be provided in a state in which the commodity monitoring program AP2 or the tracking program AP3 and the customer management program AP4 are not stored in the auxiliary storage unit 9c or the auxiliary storage unit 10c or a state in which an application program of the same type and a different version is stored in the auxiliary storage unit 9c or the auxiliary storage unit 10c and the commodity monitoring program AP2 or the tracking program AP3 and the customer management program AP4. The commodity monitoring program AP2 or the tracking program AP3 and the customer management program AP4 are written in the auxiliary storage unit 9c or the auxiliary storage unit 10c according to operation by any operator, whereby the commodity monitoring unit 9 or the main processing unit 10 may be configured.

The commodity monitoring program AP2 or the tracking program AP3 and the customer management program AP4 stored in the auxiliary storage unit 9c or the auxiliary storage unit 10c may be provided via a non-transitory and removable recording medium, such as a magnetic disk, a magneto-optical disk, an optical disk, or a semiconductor memory, or a network. The processor 9a or 10a executes information processing based on the commodity monitoring program AP2 or the tracking program AP3 and the customer management program AP4, whereby the commodity management database DB1 or the tracking database DB2 and the member management database DB3 are configured in the auxiliary storage unit 9c or the auxiliary storage unit 10c. At least one of the commodity monitoring program AP2 and the commodity management database DB1 may be stored in the main memory 9b. At least a part of the tracking program AP3, the customer management program AP4, the tracking database DB2, and the member management database DB3 may be stored in the main memory 10b.

The operation of the transaction processing system 100 configured as explained above is described below. The steps explained below is an example. The order of the steps may be changed, one or more of the steps may be omitted, and one or more steps may be added, as appropriate.

For example, the registration device 101 is installed at a store front or the like during a busy hour so that top selling commodities and the like in the time period are displayed and sold without involvement of the store clerk. To achieve that operation, the registration device 101 includes the casters 1b and the handles 1c and can be easily moved by the store clerk or the like. However, the registration device 101 may be installed at any place such as the inside of a building or may be permanently installed at a particular location. Uses of the registration device 101 are not limited to the examples explained above. If the registration device 101 is permanently installed at a specific location, the casters 1b and the handles 1c may be omitted. Electric components included in the registration device 101 may operate with power supply from a commercial power supply or the like using a power supply cable or may operate with power supply from a battery mounted on the registration device 101.

If a plurality of commodities are displayed in a measurement area of one weighting scale 6 on the shelf plate 1a, the plurality of commodities are identified by the same commodity code. An administrator such as a store clerk designates, with predetermined operation in the UI unit 5, which commodity is displayed in which measurement area. For example, the processor 5c causes the touch panel 5a to display a GUI (graphical user interface) screen for selecting a measurement area and receives designation of a measurement area by a touch on the GUI screen. The processor 5c causes the reader 5b to read a commodity barcode held over the reader 5b by the administrator. Here, the processor 5c determines that a commodity identified by a commodity code represented by the commodity barcode read by the reader 5b is displayed in the designated measurement area.

In response to this designation, in the UI unit 5, the processor 5c finds out, from the commodity management database DB1, the data record DR1 in which the weighting scale ID of the weighting scale 6 corresponding to the designated measurement area is set in the field F11 and sets the commodity code of the designated commodity in the field F12 of the data record DR1. At this time, for example, the administrator puts a specified number of pieces of the commodity in the measurement area. For example, the processor 5c acquires a measurement value of the weighting scale 6 corresponding to the measurement area and divides the measurement value by the specified number to calculate the single item weight. The processor 5c sets the calculated single item weight in the field F13 of the data record DR1 in which the commodity code is set. The processor 5c may set the acquired measurement value or may provisionally set a predetermined value such as zero in the field F14 of the data record DR1.

The commodity management database DB1 only has to coincide with a display state of commodities on the shelf plates 1a. Any method may be used to update the commodity management database DB1. For example, the processor 5c may update the commodity management database DB1 according to an instruction from any other information processing device. The processor 5c may access the sales management device 102 or any other server device via the communication unit 5g, the communication path 8, and the communication network 104 and acquire the single item weight correlated with the commodity code.

If the registration device 101 is in an operation state for performing customer management, in the main processing unit 10, the processor 10a executes information processing conforming to the tracking program AP3 (hereinafter referred to as tracking processing).

The tracking processing is main processing for specifying a present position in a tracking area of a customer set as a tracking target (hereinafter referred to as tracked customer) and confirming in which area among several areas decided in the tracking area relatively to the registration device 101 the position is present. Prior to explanation of the tracking processing, areas decided in the tracking area are explained.

Figure 9:
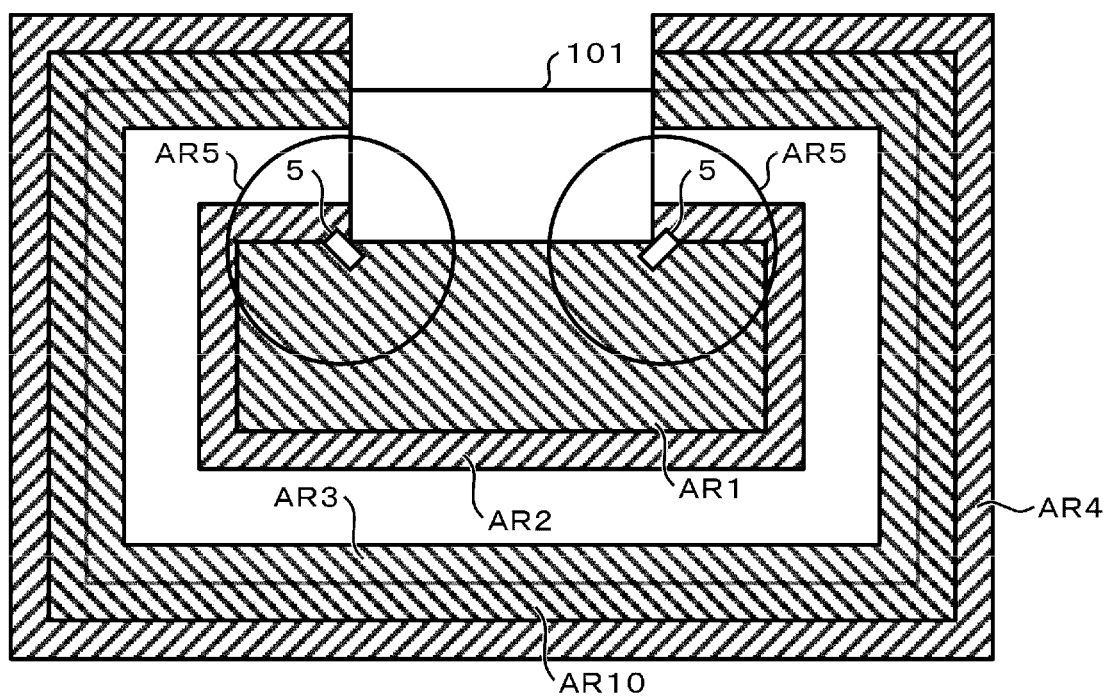
FIG. 9 is a plan view illustrating a tracking area.

FIG. 9 is a plan view illustrating the tracking area.

As illustrated in FIG. 9, a purchase area AR1, a detection area AR2, a preliminary area AR3, a decision area AR4, and two authentication areas AR5 are determined based on the position of the registration device 101. The rectangular area including the entire region of the decision area AR4 is the tracking area. Which areas are specifically set as the aforementioned areas may be specified by, for example, the tracking program AP3. That is, different sizes and ratios of the respective areas may be used. The sizes of the areas may be changeable according to an instruction by an operator such as a maintenance operator or a store administrator. Consequently, it is possible to adjust the areas considering the store layout where the registration device 101 is installed.

The purchase area AR1 is an area where a customer who is about to take out a commodity from the registration device 101 should be located. The projector 4 projects an image such that the line PL1 illustrated in FIG. 1 generally coincides with the outer edge of the purchase area AR1. If the size of the purchase area AR1 is changeable as explained above, the projector 4 enables projection magnification of the image to be changed. The projector 4 changes the projection magnification according to operation by the maintenance operator, the store administrator, or the like or according to, for example, an instruction from the processor 10a of the main processing unit 10.

The detection area AR2 is an area where a new tracked customer is detected. The detection area AR2 is determined as, for example, an area where a customer entering the purchase area AR1 passes. That is, the detection area AR2 is, for example, a belt-like area around the purchase area AR1. The detection area AR2 may partially overlap the purchase area AR1.

The preliminary area AR3 and the decision area AR4 are areas for determining that a tracked customer leaves the tracking area. Both of the preliminary area AR3 and the decision area AR4 are areas through which a customer leaving the purchase area AR1 passes. The preliminary area AR3 is closer to the purchase area AR1 than is the decision area AR4. In an example illustrated in FIG. 9, a part of the preliminary area AR3 and a part of the decision area AR4 overlap each other. In other examples, the preliminary area AR3 and the decision area AR4 may be in contact with each other without overlapping. The preliminary area AR3 can also be separated from the decision area AR4 rather than directly adjacent or overlapping. Similarly, a part of the decision area AR4 and a part of the preliminary area AR3 may overlap each other at some but not all locations and other parts of the decision area AR4 and the preliminary area AR3 may be in contact with each other without overlapping.

The two authentication areas AR5 respectively correspond to the two UI units 5. In the following explanation, if it is necessary to distinguish between the two authentication areas AR5, the authentication area AR5 corresponding to the first UI unit 5 is referred to as first authentication area AR5 and the authentication area AR5 corresponding to the second UI unit 5 is referred to as second authentication area AR5. In the example illustrated in FIG. 9, a circular area centering on each UI unit 5 is set as the authentication area AR5.

Photographing directions and visual field sizes of the two tracking cameras 2 are set such that each or both of the two tracking cameras 2 photographs a photographing area including at least the tracking area. The processor 10a executes, separately from tracking processing explained below, information processing (hereinafter referred to as detection processing) for determining a present position of a customer based on images photographed by the tracking cameras 2. For example, the processor 10a attempts, based on the images photographed by the tracking cameras 2, detection of the customer photographed in the image. If succeeding in detecting the customer, the processor 10a determines the position of the customer. As processing for determining the position of the customer from the image, various well-known methods can be used as appropriate. If a camera device including a distance measuring function, such as a TOF camera or a stereo camera, is used as the tracking cameras 2, the processor 10a may determine the present position of the customer taking into account the measurement result by the function. The processor 10a periodically executes the detection processing at a predetermined interval.

Figure 10:
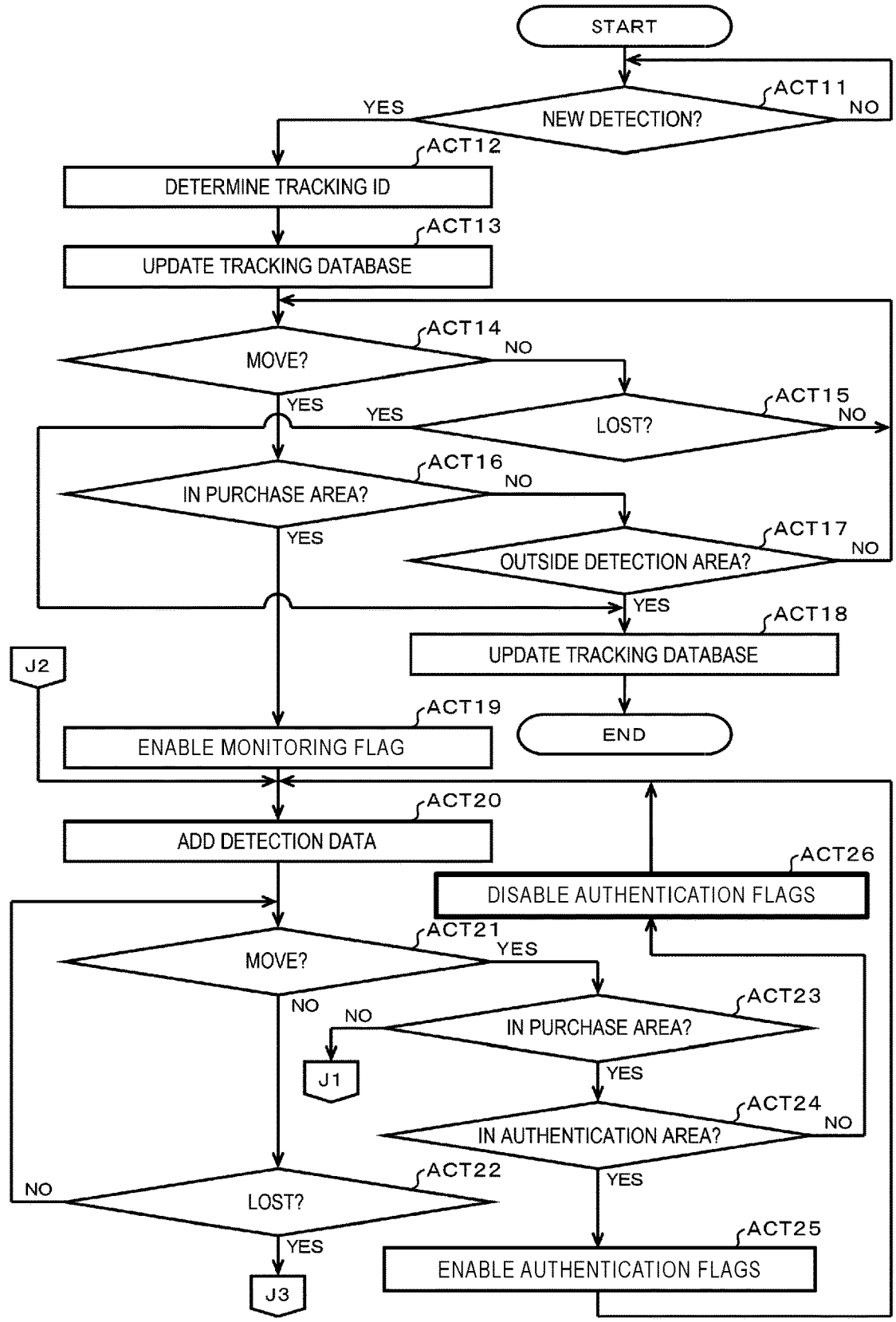
FIG. 10 is a flowchart of tracking processing.
Figure 11:
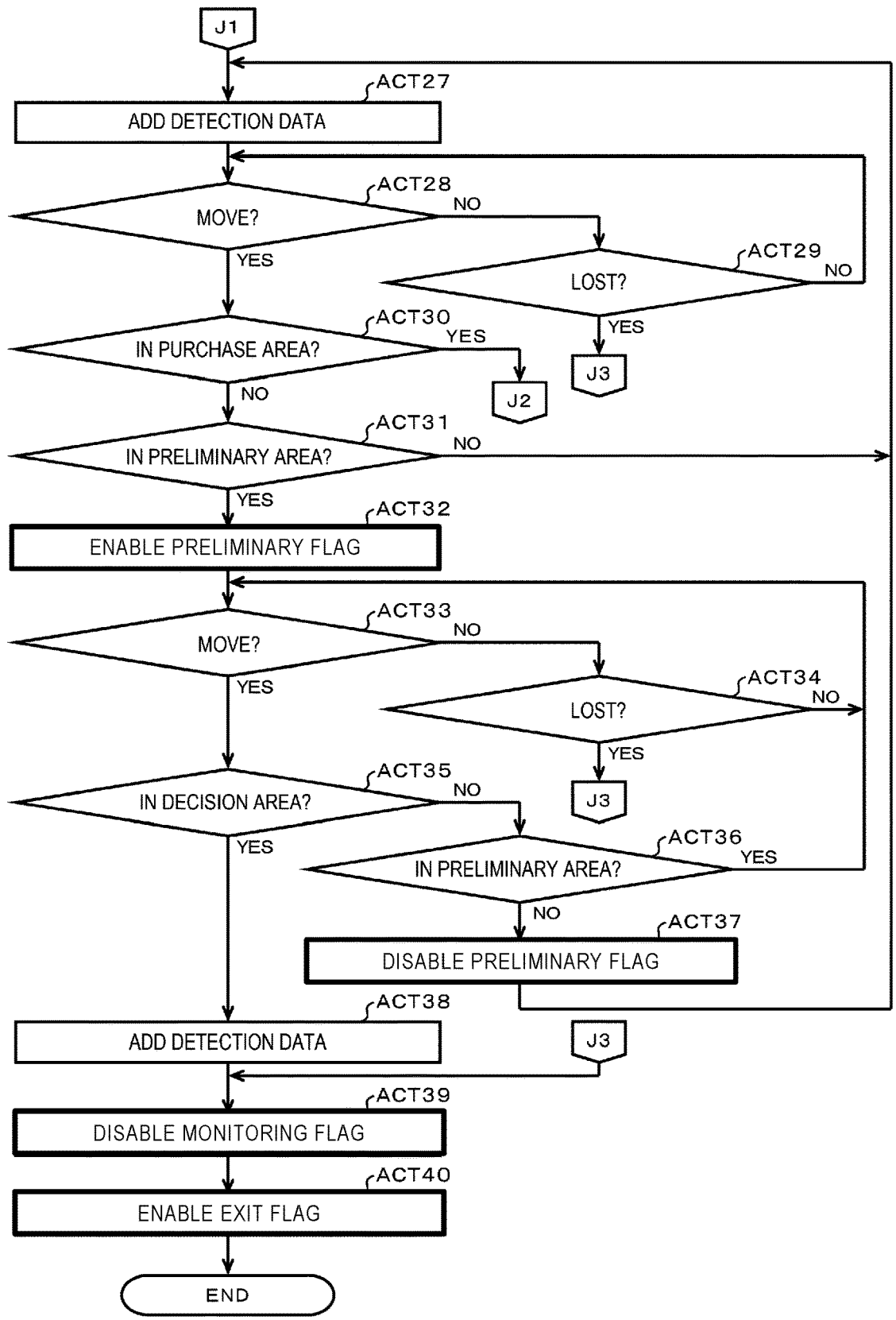
FIG. 11 is a flowchart of the tracking processing.

FIGS. 10 and 11 are flowcharts of the tracking processing.

In ACT 11 in FIG. 10, the processor 10a waits for a customer set as a target of tracking to be detected anew. For example, if a customer detected as being located in the detection area by the detection processing is not set as a tracking target, the processor 10a determines YES and proceeds to ACT 12. If proceeding to ACT 12 in this way, the processor 10a starts the tracking processing in another thread while continuing the tracking processing. That is, in a situation in which a plurality of customers set as targets of tracking are present, the processor 10a executes the tracking processing in parallel for each customer. If the customer detected as being located in the detection area by the detection processing is not a tracked customer in any other tracking processing, the processor 10a determines that the customer is not set as a tracking target.

In ACT 12, the processor 10a determines, for the customer detected anew, a tracking ID not to overlap tracking IDs of other tracked customers.

In ACT 13, the processor 10a updates the tracking database DB2 in order to manage the customer detected anew as a tracked customer. For example, the processor 10a adds a new data record DR2 to the tracking database DB2. The processor 10a sets the tracking ID determined in ACT 12 in the field F21 of the new data record DR2. The processor 10a disables all of flags of the fields F22 to F26 of the new data record DR2. The processor 10a sets, in the field F27 of the new data record DR2, detection data representing the present position of the customer and the present date and time determined by the detection processing about the customer detected anew. The processor 10a does not include the field F28 and subsequent fields in the new data record DR2.

Consequently, the customer detected anew is set as a tracked customer. As explained above, a plurality of kinds of tracking processing may be executed in parallel. A plurality of tracked customers for the registration device 101 could be present.

In ACT 14, the processor 10a determines whether the tracked customer moves. If the movement of the tracked customer cannot be detected, the processor 10a determines NO and proceeds to ACT 15.

In ACT 15, the processor 10a determines whether the tracked customer is lost track of. If the tracking of the tracked customer is continued, the processor 10a determines NO and returns to ACT 14.

In this way, in ACT 14 and ACT 15, the processor 10a waits for the tracked customer to move or to be lost track of.

For example, every time a result of the detection processing is obtained anew, the processor 10a specifies, based on the present positions of customers detected anew and positions represented by detection data set in the data record DR2 correlated with the tracked customer, the tracked customer out of the customers detected anew. The processor 10a determines, from a relation between the present position of the tracked customer and the position represented by detection data set at the end of the data record DR2 correlated with the tracked customer, whether the tracked customer moves. For example, if a separation distance between the two positions is equal to or larger than a predetermined threshold, the processor 10a determines that the tracked customer moves. If the tracked customer moves, the processor 10a determines YES in ACT 14 and proceeds to ACT 16.

In ACT 16, the processor 10a determines whether the present position of the tracked customer is the inside of the purchase area AR1. If the present position of the tracked customer is the outside of the purchase area AR1, the processor 10a determines NO and proceeds to ACT 17.

In ACT 17, the processor 10a determines whether the present position of the tracked customer is the outside of the detection area AR2. If the present position of the tracked customer is the inside of the detection area AR2, the processor 10a determines NO and returns to ACT 14.

In this way, in ACTS 14 to 17, the processor 10a waits for the tracked customer to move to the inside of the purchase area AR1 or move in the opposite direction of the purchase area AR1 and exit the detection area AR2.

If the tracked customer has left the detection area AR2 without entering the purchase area AR1, the processor 10a determines YES in ACT 17 and proceeds to ACT 18.

For example, if the data record DR2 correlated with the tracked customer in the tracking database DB2 is not updated for a predetermined period, the processor 10a determines that tracking loss occurs. If the tracking loss occurs in the waiting state in ACT 14 and ACT 15, the processor 10a determines YES in ACT 15 and directly proceeds to ACT 18.

In ACT 18, the processor 10a updates the tracking database DB2 to exclude the tracked customer from the other tracked customers in the detection area. For example, the processor 10a deletes, from the tracking database DB2, the data record DR2 in which the tracking ID of the tracked customer is set in the field F21. Consequently, the processor 10a ends the tracking processing.

Here, it is assumed that the tracked customer has taken a commodity displayed on the registration device 101 and is passing the detection area AR2 towards the purchase area AR1. If the tracked customer moves in that way, the processor 10a determines YES in ACT 16 and proceeds to ACT 19.

In ACT 19, the processor 10a enables the monitoring flag set in the field F22 of the data record DR2 in which the tracking ID of the tracked customer is set in the field F21.

In ACT 20, the processor 10a adds, to the end of the data record DR2 in which the tracking ID of the tracked customer is set in the field F21, a field in which new detection data is set. The processor 10a sets the new detection data as data representing the present position and the present time of the tracked customer determined in the latest detection processing. In this way, the detection data is added according to the movement of the tracked customer, whereby the moving track of the customer is recorded.

In ACT 21, the processor 10a determines whether the tracked customer moves. If the movement of the tracked customer cannot be detected, the processor 10a determines NO and proceeds to ACT 22.

In ACT 22, the processor 10a determines whether the tracked customer is lost track of. If the tracking of the tracked customer is continued, the processor 10a determines NO and returns to ACT 21.

In this way, in ACT 21 and ACT 22, the processor 10a waits for the tracked customer to move or to be lost track of. If the movement is detected, as in ACT 14, the processor 10a determined YES in ACT 21 and proceeds to ACT 23.

In ACT 23, the processor 10a determines whether the present position of the tracked customer is the inside of the purchase area AR1. If the present position of the tracked customer is the inside of the purchase area AR1, the processor 10a determines YES and proceeds to ACT 24.

In ACT 24, the processor 10a determines whether the present position of the tracked customer is the inside of the first or second authentication area AR5. If the present position of the tracked customer is the inside of the first or second authentication area AR5, the processor 10a determines YES and proceeds to ACT 25. That is, if the tracked customer is located in an area where the purchase area AR1 and the first or second authentication area AR5 overlap, the processor 10a proceeds to ACT 25.

In ACT 25, if the tracked customer is located in the first authentication area, the processor 10a enables the first authentication flag. If the tracked customer is located in the second authentication area, the processor 10a enables the second authentication flag. Thereafter, the processor 10a returns to ACT 20. The processor 10a adds detection data concerning a position after the movement of the tracked customer and thereafter returns to the waiting state in ACT 21.

If the present position of the tracked customer is the inside of the purchase area AR1 but is the outside of the first or second authentication area AR5, the processor 10a determines NO in ACT 24 and proceeds to ACT 26.

In ACT 26, the processor 10a disables both of the first authentication flag and the second authentication flag. Thereafter, the processor 10a returns to ACT 20, adds detection data concerning a position after the movement of the tracked customer, and thereafter returns to the waiting state in ACT 21.

If the tracked customer exits the purchase area AR1, in ACT 23, the processor 10a determines NO and proceeds to ACT 27.

In ACT 27, as in ACT 20, the processor 10a adds a field in which the detection data is set. That is, in order to record the movement of the tracked customer, the processor 10a adds new detection data to the data record DR2 correlated with the tracked customer.

In ACT 28, the processor 10a determines whether the tracked customer moves. If the movement of the tracked customer cannot be detected, the processor 10a determines NO and proceeds to ACT 29.

In ACT 29, the processor 10a determines whether the tracked customer is lost track of. If the tracking of the tracked customer is continued, the processor 10a determines NO and returns to ACT 28.

In this way, in ACT 28 and ACT 29, the processor 10a waits for the tracked customer to move or to be lost track of. If the movement of the tracked customer is detected as in ACT 14, the processor 10a determines YES in ACT 28 and proceeds to ACT 30.

In ACT 30, the processor 10a determines whether the present position of the tracked customer is the inside of the purchase area AR1. If the present position of the tracked customer is the inside of the purchase area AR1, the processor 10a determines YES and returns to ACT 20 in FIG. 10. That is, if the tracked customer returns to the inside of the purchase area AR1, the processor 10a adds new detection data in order to record the movement of the tracked customer and thereafter shifts to the waiting state in ACT 21 and ACT 22.

If the tracked customer does not return to the purchase area AR1, the processor 10a determines NO in ACT 30 in FIG. 11 and proceeds to ACT 31.

In ACT 31, the processor 10a determines whether the present position of the tracked customer is the inside of the preliminary area AR3. If the present position of the tracked customer is the outside of the preliminary area AR3, the processor 10a determines NO and returns to ACT 27. That is, the processor 10a adds new detection data in order to record the movement of the tracked customer and thereafter returns to the waiting state in ACT 28 and ACT 29.

If the tracked customer has left the purchase area AR1 and is moving to the inside of the preliminary area AR3 without returning to the purchase area AR1, the processor 10a determines YES in ACT 31 and proceeds to ACT 32.

In ACT 32, the processor 10a enables the preliminary flag set in the field F25 of the data record DR2 in which the tracking ID of the tracked customer is set in the field F21.

In ACT 33, the processor 10a determines whether the tracked customer moves. If the movement of the tracked customer cannot be detected, the processor 10a determines NO and proceeds to ACT 34.

In ACT 34, the processor 10a determines whether the tracked customer is lost track of. If the tracking of the tracked customer is continued, the processor 10a determines NO and returns to ACT 33.

In this way, in ACT 33 and ACT 34, the processor 10a waits for the tracked customer to move or to be lost track of. If the movement of the tracked customer is detected as in ACT 14, the processor 10a determines YES in ACT 33 and proceeds to ACT 35.

In ACT 35, the processor 10a determines whether the present position of the tracked customer is the inside of the decision area AR4. If the present position of the tracked customer is the outside of the decision area AR4, the processor 10a determines NO and proceeds to ACT 36.

In ACT 36, the processor 10a determines whether the present position of the tracked customer is the inside of the preliminary area AR3. If the present position of the tracked customer is the inside of the preliminary area AR3, the processor 10a determines YES and returns to ACT 33.

In this way, in ACT 33 to ACT 36, the processor 10a waits for the tracked customer to move to the inside of the decision area AR4, to move in the opposite direction of the decision area AR4 and exit the preliminary area AR3, or to be lost track of.

If the tracked customer has left the preliminary area AR3 without entering the decision area AR4, the processor 10a determines NO in ACT 36 and proceeds to ACT 37.

In ACT 37, the processor 10a disables the preliminary flag set in the field F25 of the data record DR2 in which the tracking ID of the tracked customer is set in the field F21. Thereafter, the processor 10a returns to ACT 27, that is, the processor 10a adds new detection data in order to record the movement of the tracked customer and thereafter shifts to the waiting state in ACT 28 and ACT 29.

If the tracked customer has passed the preliminary area AR3 and advanced to the decision area AR4, the processor 10a determines YES in ACT 35 and proceeds to ACT 38.

In ACT 38, as in ACT 20, the processor 10a adds a field in which the detection data is set. That is, in order to record the movement of the tracked customer, the processor 10a adds new detection data to the data record DR2 correlated with the tracked customer. Thereafter, the processor 10a proceeds to ACT 39.

If determining that the tracked customer is lost track of in any one of the waiting state in ACT 21 and ACT 22 in FIG. 10, the waiting state in ACT 28 and ACT 29 in FIG. 11, and the waiting state in ACT 33 and ACT 34 in FIG. 11, the processor 10a determines YES in ACT 22, ACT 29, or ACT 34 and proceeds to ACT 39 in FIG. 11.

In ACT 39, the processor 10a disables the monitoring flag set in the field F22 of the data record DR2 in which the tracking ID of the tracked customer is set in the field F21.

In ACT 40, the processor 10a disables the exit flag set in the field F26 of the data record DR2 in which the tracking ID of the tracked customer is set in the field F21. The processor 10a ends the tracking processing.

The processor 10a executes the tracking processing as explained above. Consequently, it is possible to confirm, based on the tracking database DB2, in which area each of the tracked customers is located. The processor 10a detects, based on a result of such tracking, that the tracked customer goes away from the shelf 1.

On the other hand, if the registration device 101 is in the operation state for performing customer management, the processor 9a in the commodity monitoring unit 9 executes information processing conforming to the commodity monitoring program AP2 (hereinafter referred to as monitoring processing). The monitoring processing is information processing for monitoring movement of the commodities displayed on the registration device 101.

Figure 12:
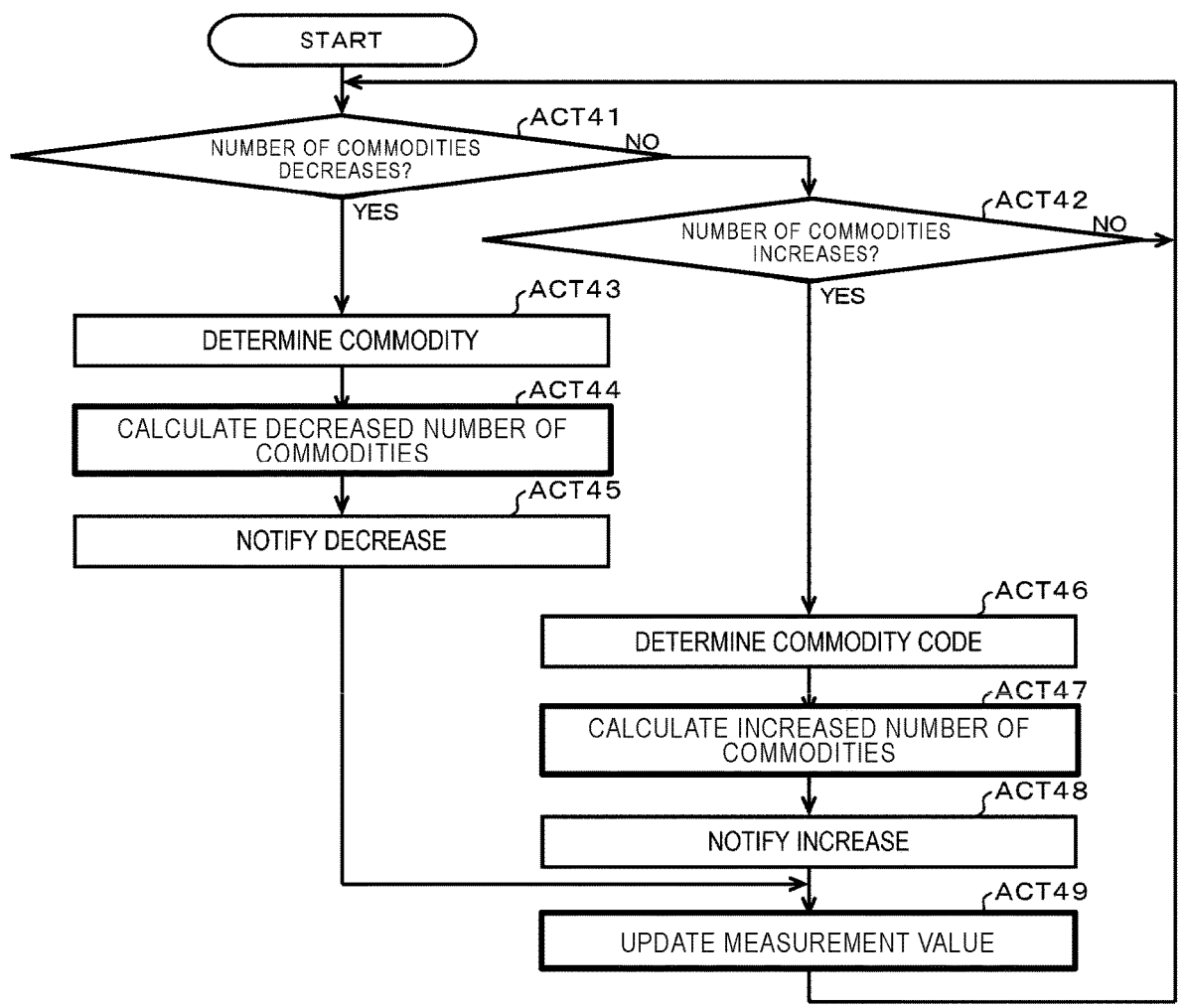
FIG. 12 is a flowchart of monitoring processing.

FIG. 12 is a flowchart of the monitoring processing.

In ACT 41, the processor 9a determines whether the number of commodities displayed on the registration device 101 decreases. If a relevant event cannot be detected, the processor 9a determines NO and proceeds to ACT 42.

In ACT 42, the processor 9a determines whether the number of commodities displayed on the registration device 101 increases. If a relevant event cannot be detected, the processor 9a determines NO and returns to ACT 41.

In this way, in ACT 41 and ACT 42, the processor 9a waits for the number of commodities to decrease or increase.

For example, if a customer takes out a commodity displayed on the registration device 101 from the registration device 101 or if a commodity displayed on the registration device 101 drops from the registration device 101, the number of commodities displayed on the registration device 101 decreases. In such a case, a measurement value of the weighting scale 6 in a measurement area where the commodity is placed decreases. If a commodity once moved from the registration device 101 is returned to the registration device 101, the number of commodities displayed on the registration device 101 increases. In such a case, a measurement value of the weighting scale 6 in a measurement area where the commodity is placed increases.

If a measurement value of any one of the weighting scales 6 decreases, the processor 9a determines YES in ACT 41 and proceeds to ACT 43. For example, if a measurement value acquired from the weighting scale 6 is smaller than the measurement value set in the field F14 of the data record DR1 correlated with the same weighting scale 6 in the commodity management database DB1, and the difference between those measurement values is equal to or larger than a specified value, the processor 9a determines that the measurement value of the weighting scale 6 decreases.

In ACT 43, the processor 9a determines the commodities, the number of which has decreased. For example, the processor 9a finds out, from the commodity management database DB1, the data record DR1 in which the weighting scale ID of the weighting scale 6 that has measured the decreased measurement value as explained above is set in the field F11. The processor 9a determines, as the commodities, the number of which has decreased, the commodities identified by the commodity code set in the field F12 of the data record DR1.

In ACT 44, the processor 9a calculates the decreased number of the commodities. For example, the processor 9a sets, as the decreased number of the commodities, a integer value obtained by dividing the difference value calculated in ACT 43 by the single item weight set in the field F13 of the data record DR1 correlated with the same weighting scale 6 in the commodity management database DB1.

In ACT 45, the processor 9a notifies the decrease of the commodities to the main processing unit 10. For example, the processor 9a controls the communication unit 9d to send notification data for notifying the decrease of the commodities to the main processing unit 10 via the communication path 8. The processor 9a includes, in the notification data, identification data for identifying the notification of the decrease, a commodity code of the commodities, and the decreased number thereof.

In this way, the processor 9a detects, based on the change of the measurement value by the weighting scale 6, the movement of a commodity from the shelf 1.

On the other hand, in ACT 42, if a measurement value of any one of the weighting scales 6 increases, the processor 9*a* determines YES and proceeds to ACT 46. For example, if the measurement value acquired from the weighting scale 6 is larger than the measurement value set in the field F14 of the data record DR1 correlated with the same weighting scale 6 in the commodity management database DB1, and the difference between those measurement values is equal to or larger than the specified value, the processor 9*a* determines that the measurement value of the weighting scale 6 increases.

In ACT 46, the processor 9*a* determines the commodities, the number of which has increased. For example, the processor 9*a* finds out, from the commodity management database DB1, the data record DR1 in which the weighting scale ID of the weighting scale 6 that has measured the increased measurement value as explained above is set in the field F11. The processor 9*a* determines, as the commodities, the number of which has increased, the commodities identified by the commodity code set in the field F12 of the data record DR1.

In ACT 47, the processor 9*a* calculates the increased number of the commodities. For example, the processor 9*a* sets, as the increased number of the commodities, an integer value obtained by a dividing the difference value calculated in ACT 43 by the single item weight set in the field F13 of the data record DR1 correlated with the same weighting scale 6 in the commodity management database DB1.

In ACT 48, the processor 9*a* notifies the increase of the commodities to the main processing unit 10. For example, the processor 9*a* controls the communication unit 9*d* to send notification data for notifying the increase of the commodities to the main processing unit 10 via the communication path 8. The processor 9*a* includes, in the notification data, identification data for identifying the notification of the increase, a commodity code of the commodities, and the increased number thereof.

If finishing the notification in ACT 45 or ACT 48, the processor 9*a* proceeds to ACT 49.

In ACT 49, the processor 9*a* updates the measurement value set in the field F14 of the data record DR1 correlated with the weighting scale 6, the measurement value of which changes, in the commodity management database DB1 to the measurement value after the change. Thereafter, the processor 9*a* returns to the waiting state in ACT 41 and ACT 42.

If the registration device 101 is in the operation state for performing customer management, the processor 10*a* executes information processing conforming to the customer management program AP4 (hereinafter referred to as customer management processing) separately from the detection processing and the tracking processing explained above.

Figure 13:
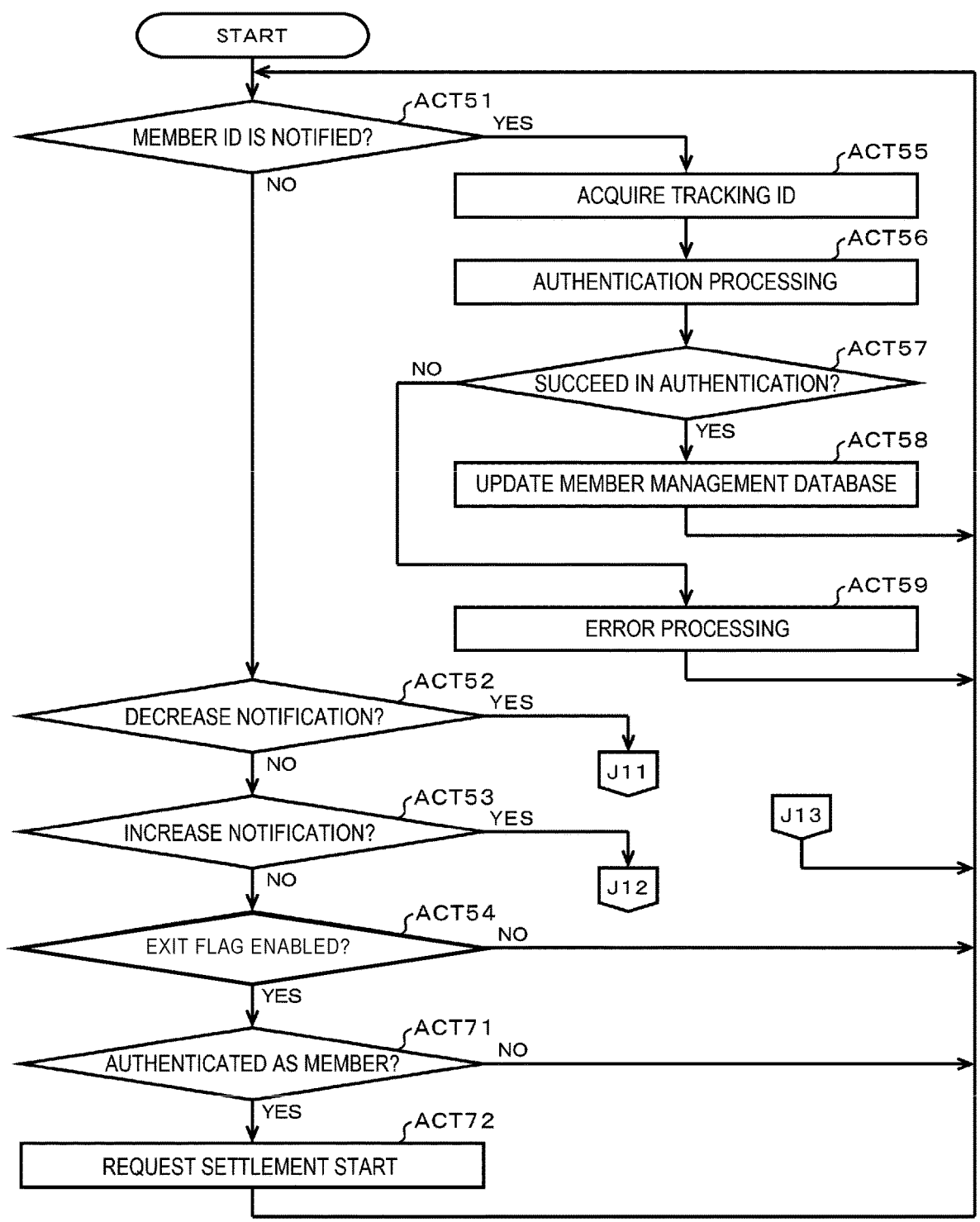
FIG. 13 is a flowchart of customer management processing.
Figure 14:
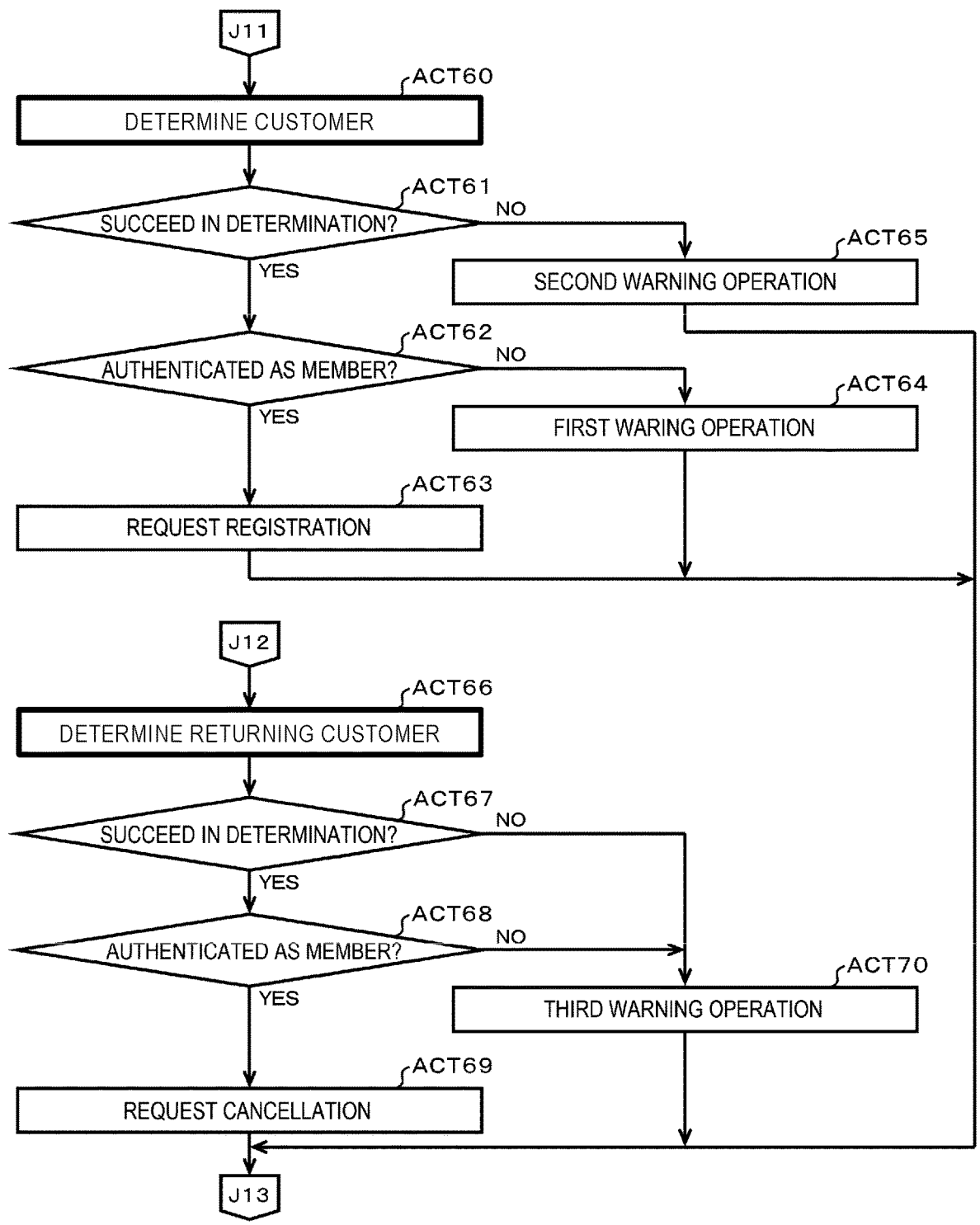
FIG. 14 is a flowchart of the customer management processing.

FIGS. 13 and 14 are flowcharts of the customer management processing.

In ACT 51 in FIG. 13, the processor 10*a* determines whether a member ID is notified. If the notification is not received, the processor 10*a* determines NO and proceeds to ACT 52.

In ACT 52, the processor 10*a* determines whether a decrease notification is received. If the notification is not received, the processor 10*a* determines NO and proceeds to ACT 53.

In ACT 53, the processor 10*a* determines whether an increase notification is received. If the notification is not received, the processor 10*a* determines NO and proceeds to ACT 54.

In ACT 54, the processor 10*a* determines whether the exit flag is enabled. If a relevant event cannot be detected, the processor 10*a* determines NO and returns to ACT 51.

In this way, in ACT 51 to ACT 54, the processor 10*a* waits for the member ID, the decrease notification, or the increase notification, or the exist flag to be enabled.

To a customer registered as a member, a member ID for distinguishing the customer from other customers is given. The customer registered as a member can register settlement information for settlement by a settlement method not involving payment by cash. Various kinds of personal information about the customer registered as a member, the member ID, and the settlement information are managed by the sales management device 102 or the settlement device 103 or managed by another member server.

If desiring to perform, using registered settlement information, settlement concerning purchase of a commodity displayed on the registration device 101, the customer registered as a member causes the UI unit 5 to read the member ID. For example, the customer causes a portable information terminal carried by the customer to display a barcode representing the member ID, and causes the reader 5*b* of the UI unit 5 to read the barcode. Any reading method may be used for reading the member ID via the UI unit 5.

In the UI unit 5, if the member ID is read by the reader 5*b*, the processor 5*c* notifies the member ID to the main processing unit 10 with information processing based on the UI program AP1. For example, the processor 5*c* controls the communication unit 5*g* to send notification data including the identification data for identifying the notification of the member ID and the member ID to the main processing unit 10 via the communication path 8.

For example, if a customer is enforced to cause the UI unit 5 to read the member ID in a state in which the customer faces the UI unit 5 and the size of the authentication area AR5 is appropriately set, the same authentication flag is not enabled about a plurality of tracked customers. However, the processor 5*c* may specify, for example, based on an image photographed by the monitoring camera 3 or an image photographed by a TOF camera or the like, a tracked customer who performs an action of causing the UI unit 5 to read the member ID and may notify a tracking ID of the tracked customer.

In the main processing unit 10, if the notification data for notification of the member ID is received by the communication unit 10*d*, the processor 10*a* determines YES in ACT 51 and proceeds to ACT 55.

In ACT 55, the processor 10*a* acquires a tracking ID of the customer whose member ID has been read and notified by the UI unit 5. For example, if the member ID has been notified from the first UI unit 5, the processor 10*a* finds out, from the tracking database DB2, the data record DR2 in which the first authentication flag is enabled. If the member ID is notified from the second UI unit 5, the processor 10*a* finds out, from the tracking database DB2, the data record DR2 in which the second authentication flag is enabled. The processor 10*a* acquires a tracking ID set in the field F21 of the data record DR2. If a plurality of data records DR2 in which the authentication flag corresponding to the UI unit 5 that has notified the member ID is enabled are found, the processor 10*a* selects one data record DR2 according to a predetermined rule. For example, the processor 10*a* selects the data record DR2 in which a position represented by detection data set in an end field is closer to the center of the authentication area.

In ACT 56, the processor 10*a* performs authentication processing about the notified member ID. For example, the processor 10a inquires a device that monitors various kinds of personal information, a member ID, and settlement information about the customer registered as a member and determines that the notified member ID is the valid member ID given to the member.

In ACT 57, the processor 10a determines whether authentication is successfully done. If authentication is successfully done, the processor 10a determines YES and proceeds to ACT 58.

In ACT 58, the processor 10a updates the member management database DB3 to include the data record DR3 for management of the member whose member ID has been read by the UI unit 5. That is, for example, the processor 10a sets the notified member ID in the field F31 and adds, to the member management database DB3, new data record DR3 in which the tracking ID acquired in ACT 55 is set in the field F32. Thereafter, the processor 10a returns to the waiting state in ACT 51 to ACT 54.

In this way, the processor 10a identifies the tracked customer as the member identified by the notified member ID. The identity of the member is specified by the member registration. That is, the processor 10a identifies the identity of the tracked customer.

If authentication is not successfully done in ACT 56, the processor 10a determines NO in ACT 57 and proceeds to ACT 59.

In ACT 59, the processor 10a executes error processing. The error processing is processing for notifying the customer that authentication has failed. For example, the processor 10a instructs the UI unit 5, which has read the member ID, to display a predetermined error screen for notifying the customer that the processor 10a fails in the authentication. Alternatively, for example, the processor 10a instructs the portable information terminal, which has displayed the barcode representing the member ID, to display the error screen. Thereafter, the processor 10a returns to the waiting state in ACT 51 to ACT 54.

If the notification data for the decrease notification is received by the communication unit 10d, the processor 10a determines YES in ACT 52 and proceeds to ACT 60 in FIG. 14.

In ACT 60, the processor 10a determines a taking-out customer who took out the commodity from the registration device 101. For example, the processor 10a extracts, from the tracking database DB2, all the data records DR2 in which the monitoring flags set in the fields F22 are enabled and sets, as candidates of the taking-out customer, all tracked customers identified by tracking IDs set in the fields F21 of the relevant data records DR2. When taking out a commodity from the registration device 101, the customer extends his or her arm to the commodity and retracts the arm after gripping the commodity. For example, the processor 10a specifies, based on an image photographed by the monitoring camera 3, a tracked customer who performs the action among the tracked customers set as the candidates of the taking-out customer and determines the tracked customer as the taking-out customer.

More specifically, for example, by analyzing changes of a plurality of images photographed by the monitoring camera 3 in a monitoring period determined in advance considering a period in which the action for taking a commodity is performed, the processor 10a specifies the customer who has performed the action. Then, the processor 10a determines the position of the customer. The processor 10a selects, out of the extracted data records DR2, the data record DR2 in which a position indicated by detection data set in an end field is closest to the specified position. If a separation distance between the position indicated by the detection data set in the end field of the data record DR2 and the specified position is shorter than a specified distance, the processor 10a determines, as the taking-out customer, a tracked customer identified by the tracking ID set in the field F21 of the data record DR2. If a relevant tracked customer is not found, the processor 10a determines that the taking-out customer is unknown. The processor 10a may measure the length of the arm of the taking-out customer based on a relation between the position indicated by the detection data set in the end field in the selected data record DR2 and a display position of the decreased commodity and the image photographed by the monitoring camera 3 and, if the length is larger than a specified length, determine that the taking-out customer is unknown.

In most cases, if the tracked customer retracts the arm, then movement of a commodity and a change in a measurement value of the weighting scale 6 also occurs. However, because of, for example, vibration of the shelf plates 1a, a slight time is required until the measurement value of the weighting scale 6 stabilizes. Therefore, a time lag occurs until the weighting scale 6 outputs a new measurement value. That is, if the decrease notification is received, most of the action of the taking-out customer taking out the commodity has ended. That is, the monitoring period begins before the decrease notification is received. Therefore, for example, the processor 10a buffers images photographed by the monitoring camera 3 in the auxiliary storage unit 10c or the like for a fixed period. After the decrease notification is received, the processor 10a analyzes images concerning the monitoring period among the buffered images. Alternatively, the processor 10a may execute the processing in ACT 60 as processing of a thread different from the customer management processing.

In ACT 61, the processor 10a determines whether the processor 10a succeeds in determining the taking-out customer. If succeeding in determining the taking-out customer, the processor 10a determines YES and proceeds to ACT 62.

In ACT 62, the processor 10a determines whether the tracked customer determined as the taking-out customer is already authenticated as a member. The processor 10a finds, from the member management database DB3, the data record DR3 in which the same tracking ID as the tracking ID set in the field F21 of the data record DR2 selected in ACT 60 is set in the field F32. If the data record DR3 is found, the processor 10a determines YES and proceeds to the ACT 63.

In ACT 63, the processor 10a requests the sales management device 102 to register the commodity as a commodity to be registered. For example, the processor 10a controls the communication unit 10d to send request data for the request to the sales management device 102 via the communication path 8. Then, the request data is relayed by the communication unit 7 and transmitted to the sales management device 102 via the communication network 104. The processor 10a includes, in the request data, identification data for identifying the registration request, a commodity code of the commodity to be registered, the quantity of the commodity, and the member ID. The processor 10a includes, in the request data, as the commodity code of the commodity to be registered, the commodity code included in the received notification data explained above. The processor 10a includes, in the request data, as the quantity of the commodity, the decreased number of the commodities included in the received notification data explained above. The processor 10a includes, in the request data, the member ID set in the field F31 of the data record DR3 found in ACT 62.

If receiving the request data, the sales management device 102 performs registration processing for registering a commodity identified by the commodity code included in the request data as a purchased commodity of the member identified by the member ID included in the request data by the quantity of the purchased commodity included in the request data. The registration processing may be the same processing as the processing performed in a transaction processing device such as a conventional POS terminal.

If confirming in ACT 62 that the tracked customer is not authenticated as a member yet, the processor 10*a* determines NO and proceeds to ACT 64. For example, if the data record DR3 in which the same tracking ID as the tracking ID set in the field F21 of the data record DR2 selected in ACT 60 is set in the field F32 cannot be found from the member management database DB3, the processor 10*a* determines that the tracked customer is not authenticated as a member yet.

In ACT 64, the processor 10*a* performs a first warning operation. The first warning operation is operation for urging the taking-out customer to perform settlement of the commodity taken out from the registration device 101. As the first warning operation, for example, the processor 10*a* instructs the UI unit 5 to display a predetermined screen. As the first warning operation, for example, the processor 10*a* instructs the UI unit 5 to output a predetermined voice message. As the first warning operation, the processor 10*a* may perform any operation different from these operations or may perform a plurality of kinds of operations. Contents of the screen, the voice message, or the like may be decided as appropriate according to circumstances of the store in which the registration device 101 is set. In the case of a store in which a checkout counter where a store clerk is present or a checkout counter of a self-service type is provided, for example, the contents of the screen, the voice message, or the like are contents for urging the taking-out customer to perform settlement in the checkout counter. In the case of a store that limits purchase of commodities displayed on the registration device 101 to only members, for example, the contents of the screen, the voice message, or the like are contents for urging the taking-out customer to return commodities to a store clerk. According to the first warning operation, if a customer who does not understand a service provided by the registration device 101 takes out a commodity from the shelf 1, it is possible to cause the customer to appropriately perform actions thereafter.

If a customer who is not a member is allowed to perform settlement of a commodity displayed on the registration device 101 in the checkout counter where a store clerk is present or the self-service type checkout counter, even if the tracked customer not finishing member authentication takes out a commodity from the shelf 1, this does not correspond to an abnormal state. Therefore, the first warning operation in this case is not warning for the abnormal state. In the case of a store that limits purchase of commodities displayed on the registration device 101 to only members, if the tracked customer not finishing member authentication takes out a commodity from the shelf 1, this corresponds to the abnormal state. Therefore, the first warning operation in this case is equivalent to the warning for the abnormal state.

If failing in determining the taking-out customer in ACT 60, the processor 10*a* determines NO in ACT 61 and proceeds to ACT 65. This case occurs if the processor 10*a* determines in ACT 60 that the taking-out customer is unknown as explained above. This case also occurs if a customer not tracked by the tracking processing because of some obstacle takes out a commodity or if a commodity drops from the shelf plate 1*a*. These cases are equivalent to abnormal states.

In ACT 65, the processor 10*a* performs a second warning operation. The second warning operation may be the same operation as the first warning operation. However, contents in the second warning operation are differentiated from the contents in the first warning operation. For example, the contents in the second warning operation are, for example, contents for urging the taking-out customer or a customer present around the taking-out customer to consult a store clerk. Alternatively, the second warning operation may be an instruction of screen display or voice message output to a terminal device used by the store clerk. The contents in the second warning operation in this case are, for example, contents for urging the store clerk to examine a situation and take some measures. Since a customer does not know whether the customer is correctly tracked by the tracking processing, the customer is not responsible for an abnormal state that occurs because the customer takes out a commodity from the shelf 1. The customer cannot understand a reason for abnormality. However, the customer can solve the abnormal state if the customer consults the store clerk according to the second warning operation and the store clerk appropriately copes with the abnormal state.

If ending ACT 63, ACT 64, or ACT 65, the processor 10*a* returns to the waiting state in ACT 51 to ACT 54 in FIG. 13.

If the notification data for the increase notification is received by the communication unit 10*d*, the processor 10*a* determines YES in ACT 53 in FIG. 13 and proceeds to ACT 66 in FIG. 14.

In ACT 66, the processor 10*a* determines a returning customer who returns the commodity, the number of which has been increased, to the registration device 101. For example, the processor 10*a* extracts, from the tracking database DB2, all of the data records DR2 in which the monitoring flags set in the fields F22 are enabled and sets, as candidates of the returning customer, all of tracked customers identified by the tracking IDs set in the fields F21 of the relevant data record DR2. If the customer takes out a commodity from the registration device 101, the customer extends his or her arm to the commodity, places the gripped commodity on the shelf plate 1*a*, and thereafter retracts the arm. Therefore, for example, the processor 10*a* specifies, based on an image photographed by the monitoring camera 3, a tracked customer who performs the action explained above among the tracked customers set as the candidates of the returning customer and determines the tracked customer as the returning customer.

More specifically, for example, the processor 10*a* specifies a customer performing the action and determines a position of the customer by analyzing changes of a plurality of images photographed by the monitoring camera 3 in a monitoring period determined in advance considering a period in which the action for returning a commodity is performed. The processor 10*a* selects, out of the extracted data records DR2, the data record DR2 in which a position indicated by detection data set in an end field is closest to the specified position. If a separation distance between the position indicated by the detection data set in the end field of the data record DR2 and the specified position is smaller than a specified distance, the processor 10*a* determines, as the returning customer, the tracked customer identified by the tracking ID set in the field F21 of the data record DR2. If the relevant tracked customer cannot be found, the processor 10*a* determines that the returning customer is unknown. The processor 10*a* may measure the length of the arm of the returning customer based on a relation between the position indicated by the detection data set in the end field in the selected data record DR2 and a display position of the increased commodity and the image photographed by the monitoring camera 3 and, if the length is larger than a specified length, determine that the returning customer is unknown.

If the commodity is returned, as in the case in which the commodity is taken out, the monitoring period starts before the increase notification is received. Therefore, for example, the processor 10a buffers images photographed by the monitoring camera 3 in the auxiliary storage unit 10c or the like for a fixed period. After the increase notification is received, the processor 10a analyzes images concerning the monitoring period among the buffered images. Alternatively, the processor 10a may execute the processing in ACT 66 as processing of a thread different from the customer management processing.

In ACT 67, the processor 10a determines whether the processor 10a succeeds in the determination of the returning customer. If succeeding in determining the returning customer, the processor 10a determines YES and proceeds to ACT 68.

In ACT 68, the processor 10a determines whether member authentication has already been performed about the tracked customer determined as the returning customer. The processor 10a finds, from the member management database DB3, the data record DR3 in which the same tracking ID as the tracking ID set in the field F21 of the data record DR2 selected in ACT 66 is set in the field F32. If the data record DR3 is found, the processor 10a determines YES and proceeds to ACT 69.

In ACT 69, the processor 10a requests the sales management device 102 to cancel the registered commodity. For example, the processor 10a controls the communication unit 10d to send request data for the request to the sales management device 102 via the communication path 8. Then, the request data is relayed by the communication unit 7 and transmitted to the sales management device 102 via the communication network 104. The processor 10a includes, in the request data, identification data for identifying the cancellation request, a commodity code of a commodity to be cancelled, the quantity of the commodity, and a member ID. The processor 10a includes, in the request data, as the commodity code of the commodity to be cancelled, the commodity code included in the received notification data. The processor 10a includes, in the request data, as the quantity of the commodity, the decreased number of commodities included in the received notification data. The processor 10a includes, in the request data, the member ID set in the field F31 of the data record DR3 found in ACT 68.

If receiving the request data, the sales management device 102 performs cancellation processing for deleting, from registered commodities of the member identified by the member ID included in the request data, by the quantity included in the request data, the commodity identified by the commodity code included in the request data. In this way, a customer registered as a member is allowed to freely return, to the shelf 1, a commodity once taken out from the shelf 1. Consequently, the customer can select a commodity, which the customer is about to purchase, while taking the commodity from the shelf 1 and checking the commodity.

If confirming in ACT 68 that the customer is not authenticated as a member, the processor 10a determines NO and proceeds to ACT 70. For example, if the data record DR3 in which the same tracking ID as the tracking ID set in the field F21 of the data record DR2 selected in ACT 66 is set in the field F32 cannot be found from the member management database DB3, the processor 10a determines that the customer is not authenticated as a member. This case occurs if a customer who does not understand a service provided by the registration device 101 is surprised at the first warning operation performed according to taking out of a commodity from the shelf 1 by the customer and returns the commodity to the shelf 1 in a fluster.

If failing in determining the returning customer in ACT 66, the processor 10a determines NO in ACT 67 and proceeds to ACT 70. This case occurs if the processor 10a determines in ACT 66 that the returning customer is unknown as explained above. The case also occurs if a customer not tracked by the tracking processing because of some obstacle returns a commodity. These cases are equivalent to abnormal states.

In ACT 70, the processor 10a performs a third warning operation. The third warning operation is operation for notifying a store clerk or the like that wrongful commodity return is performed and urging the store clerk or the like to cope with the wrongful commodity return. As the third warning operation, for example, the processor 10a instructs a terminal device used by the store clerk to perform screen display or voice message output. As the third warning operation, the processor 10a may perform any operation different from this operation or may perform a plurality of kinds of operations. Contents of a screen, a voice message, or the like may be decided as appropriate according to circumstances of the store in which the registration device 101 is set.

If the customer surprised at the first warning operation returns the commodity to the shelf 1 in a fluster as explained above, since there is no guarantee that the customer correctly returns the commodity to the original place, such an action is regarded as an abnormal state. If a tracked customer who has taken out a commodity, which is the cause of the first warning operation, returns the same commodity to a correct position of the shelf 1 according to the first warning operation, this action may not be regarded as the abnormal state. Therefore, if the same commodity is returned by the tracked customer, who has caused the first warning operation, while the first warning operation is performed, the processor 10a may release the first warning operation without performing the third warning operation.

If ending ACT 69 or ACT 70, the processor 10a returns to the waiting state in ACT 51 to ACT 54 in FIG. 13.

In ACT 54 in FIG. 13, if the exit flag set in the field F26 is enabled in any one of the data records DR2 included in the tracking database DB2, the processor 10a determines YES and proceeds to ACT 71.

In ACT 71, the processor 10a determines whether a tracked customer correlated with the enabled exit flag is authenticated as a member. The processor 10a selects, from the tracking database DB2, the data record DR2 in which the exit flag is enabled in the field F26. The processor 10a finds, from the member management database DB3, the data record DR3 in which the same tracking ID as the tracking ID set in the field F21 of the selected data record DR2 is set in the field F32. The processor 10a determines YES if the data record DR3 is found and proceeds to ACT 72.

In ACT 72, the processor 10a requests the sales management device 102 to start settlement. For example, the processor 10a controls the communication unit 10d to send request data for the request to the sales management device 102 via the communication path 8. Then, the request data is relayed by the communication unit 7 and transmitted to the sales management device 102 via the communication network 104. The processor 10a includes, in the request data, identification data for identifying the request for the settlement start and a member ID set in the field F31 of the data record DR3 found in ACT 71. Thereafter, the processor 10a returns to the waiting state in ACT 51 to ACT 54.

If the tracked customer is not authenticated as a member and the data record DR3 is not found, the processor 10a determines NO in ACT 71, passes the ACT 72, and returns to the waiting state in ACT 51 to ACT 54.

If receiving the request data, the sales management device 102 instructs the settlement device 103 to settle, concerning a member identified by the member ID included in the request data, a price concerning a registered commodity. If receiving the instruction, the settlement device 103 settles the price using settlement information registered concerning the member. Processing for the settlement may be processing for well-known settlement such as credit settlement or electronic money settlement.

As explained above, with the registration device 101, based on a moving state of a commodity from the shelf 1 and an action of a tracked customer in the purchase area AR1, the commodity taken out from the shelf 1 by the tracked customer is determined as a commodity to be registered concerning the tracked customer. Consequently, a customer does not need to perform operation for registering a commodity using devices such as a terminal for reading a barcode. It is possible to efficiently complete a transaction.

With the transaction processing system 100, it is possible to achieve automatic transaction processing about commodities sold in the store. For example, in a retail store where store clerks are present such as a convenience store or a supermarket, it is possible to reduce a burden on the store clerks by performing, using the transaction processing system 100, sales of some commodities such as bento and sandwiches in a busy lunch break time or the like.

With the registration device 101, the identity of a tracked customer is identified by member authentication. Consequently, it is possible to specify an individual who takes out a commodity from the shelf 1.

With the registration device 101, a commodity taken out from the shelf 1 by a tracked customer authenticated as a member is determined as a commodity to be registered by an authenticated member before it is detected that the tracked customer goes away from the shelf 1. Accordingly, if a customer, who is a member, enters the purchasing area and causes the UI unit 5 to read a member ID, the customer only has to carry the commodity taken out from the shelf 1 and goes away from the shelf 1. Therefore, the customer does not need to perform any operation for declaration for ending registration of the commodity to be registered.

With the registration device 101, in an abnormal state in which, for example, a commodity drops from the shelf 1 or a customer lost track of in tracking processing takes out a commodity from the shelf 1, the second warning operation is executed. Therefore, it is possible to prevent such an abnormal state from being neglected.

With the registration device 101, since the registration device 101 includes the casters 1b and is easily movable, for example, in a store where customer management is basically performed in a checkout counter where a store clerk is present, the registration device 101 is suitable for a convenient use for temporarily performing automated sales, for example, in a time period with many customers.

Various modified implementations of the embodiment explained below are possible.

The exterior of the registration device 101 illustrated in FIG. 1 is an example. The registration device 101 may be realized in any other form. For example, the registration device 101 may be another type such as a trapezoidal type or an upper surface opening type. An open-closable door may be provided in an opening surface.

A door for enabling the opening surface to be closed may be provided for the purpose of heat insulation and cooling.

The tracking processing, the monitoring processing, or the customer management processing may be performed as distributed processing by a plurality of computers. All of the tracking processing, the monitoring processing, and the customer management processing may be processed by the same computer. The tracking processing and the customer management processing may be respectively processed by different computers. The tracking processing and the monitoring processing may be processed by a computer different from a computer that processes the customer management processing or the tracking processing may be processed by a computer different from a computer that processes the monitoring processing and the customer management processing.

The processor 9a or the processor 10a may execute at least a part of the registration processing in the sales management device 102. The processor 9a or the processor 10a may execute at least a part of the settlement processing in the settlement device 103. The sales management device 102 may execute at least a part of the customer management processing.

Even if member authentication is finished, settlement may be performed at the checkout counter where a store clerk is present or the checkout counter of the self-service type.

A registered commodity may be correlated with a tracking ID. Once member authentication is performed after commodity registration is started, the member ID is correlated with the registered commodity. Alternatively, the settlement device set in the tracking area may perform settlement of a registered commodity correlated with a tracked customer located in an area corresponding to the settlement device.

A tracking target customer may be identified by the member ID without using the tracking ID.

Authentication of a member may be performed by biological authentication such as face authentication based on images photographed by the tracking cameras 2.

A part or all of the functions performed by the processor 5c, 9a, or 10a with the information processing can also be performed by hardware such as a logic circuit. Each of the functions can also be performed by combining software control with such hardware.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A device for displaying and registering a commodity to be purchased by a customer in a store, comprising:
    a shelf on which a commodity can be displayed;
    a weight sensor attached to the shelf;
    a camera positioned to capture an image of a plurality of areas on a floor of the store, the areas including a first area in front of the shelf, a second area adjacent to and at least partly surrounding the first area, and a third area outside of and separated from the second area, the first, second and third areas not overlapping each other; and a processor configured to:
- determine whether a customer has entered the second area through the third area based on images captured by the camera,
- upon determining that the customer has entered the second area through the third area, start tracking of the customer using the captured images,
- determine whether the commodity is taken from the shelf based on changes in weight measured by the sensor,
- upon determining that the commodity has been taken from the shelf, determine whether the tracked customer has performed a particular action within the first area,
- after determining that the tracked customer has performed the particular action within the first area, determine whether the tracked customer has entered the third area from the first area through the second area, and
- in response to determining that the tracked customer has entered the third area from the first area through the second area, register the taken commodity as a commodity being purchased by the tracked customer.

2. The device according to claim 1, wherein the processor is further configured to identify the tracked customer as a registered customer of the store based on the images captured by the camera.

3. The device according to claim 2, wherein the processor is further configured to start settlement processing on the taken commodity after the identified customer has entered the third area from the first area through the second area.

4. The device according to claim 1, wherein the processor is further configured to, upon determining that the particular action has been performed by a person who is not the tracked customer within the first area, issue a warning signal.

5. The device according to claim 4, further comprising:
a display configured to display an error screen when the warning signal is issued.

6. The device according to claim 4, further comprising:
a speaker configured to output a sound when the warning signal is issued.

7. The device according to claim 1, further comprising:
an input device attached to the shelf and through which identification information about the tracked customer can be input.

8. The device according to claim 1, wherein the shelf is movable on the floor of the store.

9. The device according to claim 8, further comprising:
a projector attached to the shelf and configured to project an image corresponding to the first area onto the floor of the store.

10. The device according to claim 9, wherein the first area has a rectangular shape, and the second area surrounds the first area except for a part of a side of the first area that faces the shelf.

11. A method carried out by a device for registering a commodity displayed on a shelf for purchase by a customer in a store, the method comprising:
capturing, by a camera, an image of a plurality of areas on a floor of the store, the areas including a first area in front of the shelf, a second area adjacent to and at least partly surrounding the first area, and a third area outside of and separated from the second area, the first, second and third areas not overlapping each other;
determining whether a customer has entered the second area through the third area based on images captured by the camera;
upon determining that the customer has entered the second area through the third area, starting tracking of the customer using the captured images;
determining whether the commodity is taken from the shelf based on changes in weight measured by a sensor attached to the shelf;
upon determining that the commodity has been taken from the shelf, determining whether the tracked customer has performed a particular action within the first area;
after determining that the tracked customer has performed the particular action within the first area, determining whether the tracked customer has entered the third area from the first area through the second area; and
in response to determining that the tracked customer has entered the third area from the first area through the second area, registering the taken commodity as a commodity being purchased by the tracked customer.

12. The method according to claim 11, further comprising:
identifying the tracked customer as a registered customer of the store based on the images captured by the camera.

13. The method according to claim 12, further comprising:
performing settlement processing on the taken commodity after the identified customer has entered the third area from the first area through the second area.

14. The method according to claim 11, further comprising:
upon determining that the particular action has been performed by a person who is not the tracked customer, issuing a warning signal.

15. The method according to claim 14, further comprising:
displaying an error screen on a display when the warning signal is issued.

16. The method according to claim 14, further comprising:
outputting a sound when the warning signal is issued.

17. The method according to claim 11, further comprising:
receiving identification information about the tracked customer via an input device attached to the shelf.

18. The method according to claim 11, wherein the shelf is movable on the floor of the store.

19. The method according to claim 18, further comprising:
projecting, by a projector, an image corresponding to the first area onto the floor.

20. A non-transitory computer readable medium storing a program causing a computer to execute a method for registering a commodity displayed on a shelf and to be purchased by a customer in a store, the method comprising:
capturing, by a camera, an image of a plurality of areas on a floor of the store, the areas including a first area in front of the shelf, a second area adjacent to and at least partly surrounding the first area and the shelf, and a third area outside of and separated from the second area, the first, second and third areas not overlapping each other;
determining whether a customer has entered the second area through the third area based on images captured by the camera;

upon determining that the customer has entered the second area through the third area, starting tracking of the customer using the captured images;
determining whether the commodity is taken from the shelf based on changes in weight measured by a sensor attached to the shelf;
upon determining that the commodity has been taken from the shelf, determining whether the tracked customer has performed a particular action within the first area;
after determining that the tracked customer has performed the particular action within the first area, determining whether the tracked customer has entered the third area from the first area through the second area; and
in response to determining that the tracked customer has entered the third area from the first area through the second area, registering the taken commodity as a commodity being purchased by the tracked customer.

* * * * *